United States Patent [19]

Ito et al.

[11] 4,242,538
[45] Dec. 30, 1980

[54] RADIO CHANNEL CONTROL SYSTEMS OF MOBILE RADIO TELEPHONE SYSTEMS

[75] Inventors: Sadao Ito, Yokohama; Noriaki Yoshikawa, Yokosuka; Mitsuru Komura, Tokyo, all of Japan

[73] Assignee: Nippon Telegraph and Telephone Public Corporation, Tokyo, Japan

[21] Appl. No.: 18,368

[22] Filed: Mar. 7, 1979

Related U.S. Application Data

[63] Continuation of Ser. No. 801,022, May 26, 1977, abandoned.

[30] Foreign Application Priority Data

Jun. 28, 1976 [JP] Japan .................................. 51-76196
Jun. 28, 1976 [JP] Japan .................................. 51-76197

[51] Int. Cl.³ .............................................. H04Q 7/00
[52] U.S. Cl. .................................... 179/2 EB; 455/89
[58] Field of Search ................. 179/2 EB; 325/51, 53, 325/55, 64; 343/208; 455/89

[56] References Cited

U.S. PATENT DOCUMENTS

| | | | |
|---|---|---|---|
| 3,310,741 | 3/1967 | Uitermark et al. | 343/208 |
| 3,351,714 | 11/1967 | Kunzelman et al. | 179/2 EB |
| 3,663,762 | 5/1972 | Joel, Jr. | 179/2 EB |
| 3,764,915 | 10/1973 | Cox et al. | 179/2 EB |

OTHER PUBLICATIONS

Daniel R. McGlynn, "Microprocessors, Technology, Architecture, and Applications," (Wiley, New York) 1976, pp. 182–187.

*Primary Examiner*—Bernard Konick
*Assistant Examiner*—Joseph A. Popek
*Attorney, Agent, or Firm*—Charles E. Pfund

[57] ABSTRACT

The service area of the radio telephone system is divided into a plurality of radio zones and a base station is installed in each radio zone. The base station is connected to a control unit through a common control channel and a plurality of speech channels, the control unit is connected to an ordinary telephone network, and the control unit is controlled by first and second sequence controllers for the radio system and an exchange control unit, respectively.

In a modification, each first and second sequence controller comprises a plurality of discrete sequence controllers classified according to their functions.

10 Claims, 35 Drawing Figures

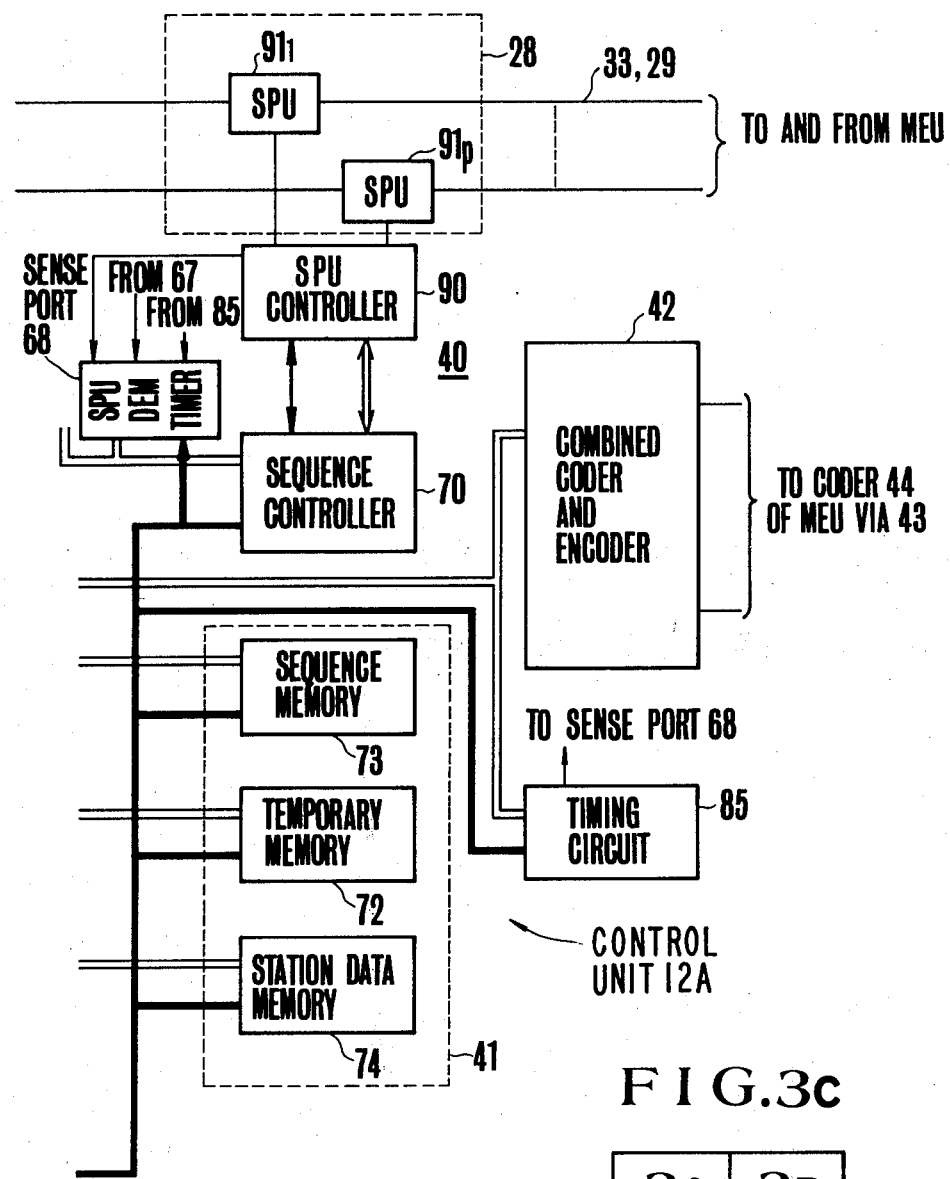

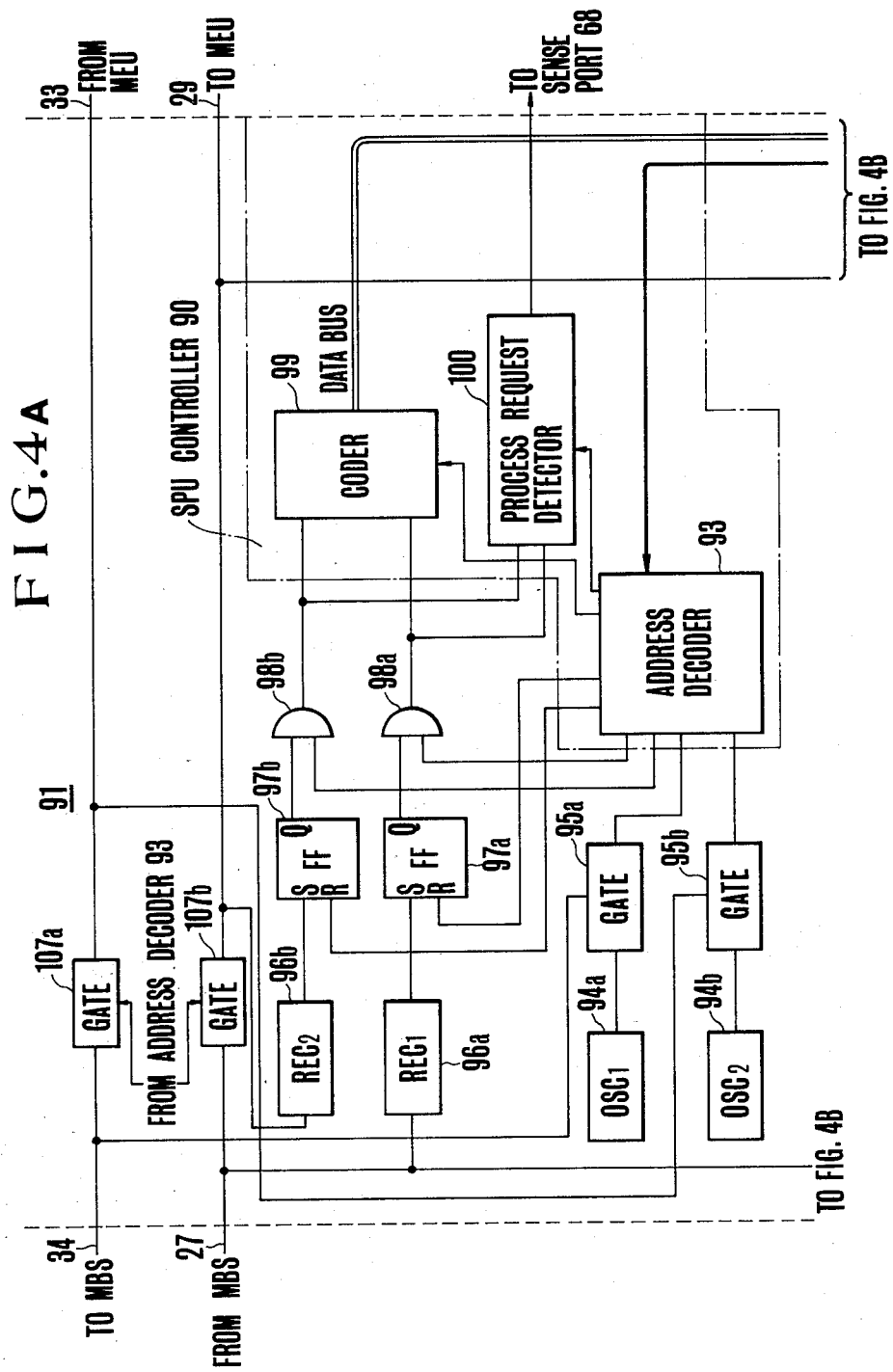

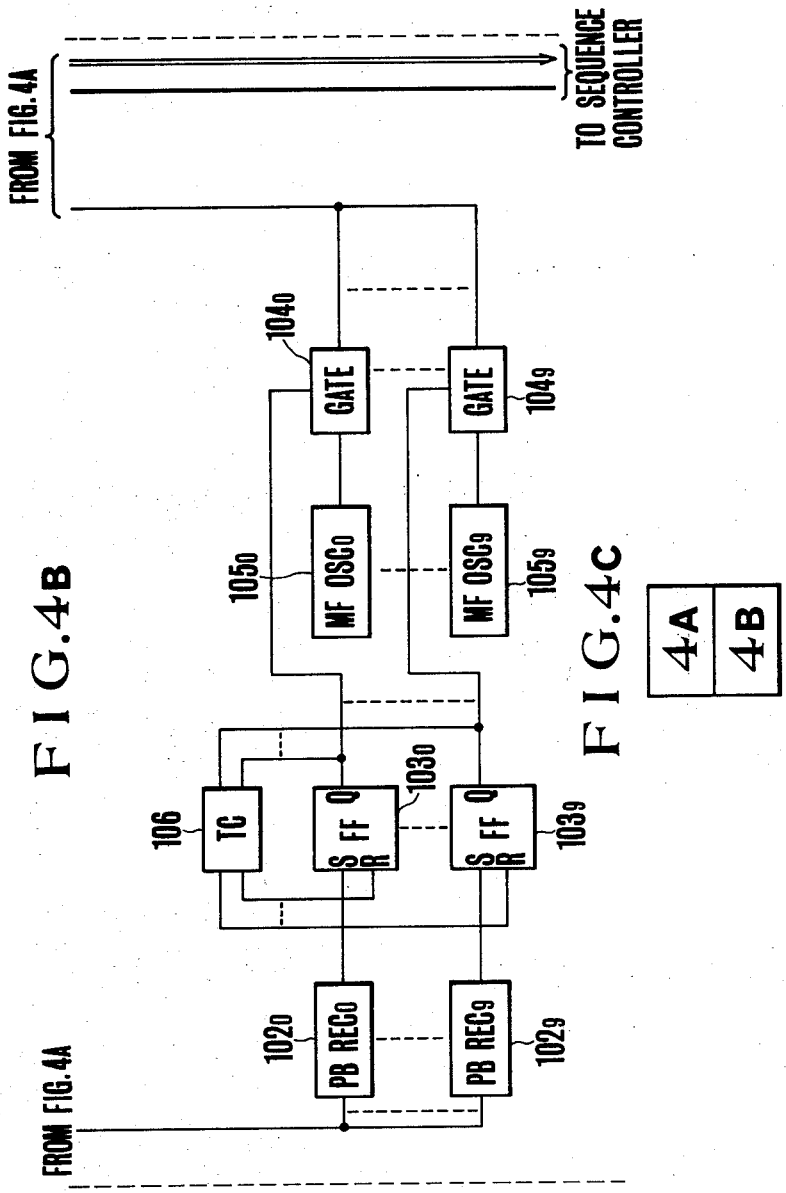

FIG. 5A

| PREAMBLE INFORMATION | START INFORMATION | SIGNAL TYPE INFORMATION | MOBILE STATION IDENTIFICATION NUMBER INFORMATION |

FIG. 5B

| START INFORMATION | SIGNAL TYPE INFORMATION | MOBILE STATION IDENTIFICATION NUMBER INFORMATION | RECEIVED SIGNAL LEVEL |

FIG. 5C

| SIGNAL TYPE INFORMATION | MOBILE STATION IDENTIFICATION NUMBER INFORMATION | IDLE SPEECH CHANNEL NUMBER INFORMATION (FREQ. CODE) |

FIG. 5D

| SIGNAL TYPE INFORMATION | MOBILE STATION IDENTIFICATION NUMBER INFORMATION | SPEECH CHANNEL NUMBER INFORMATION (MBSNo.+CHNo.) |

FIG. 11A

| SIGNAL TYPE INFORMATION | MOBILE STATION NUMBER INFORMATION |
|---|---|

FIG. 11B

| PREAMBLE INFORMATION | START INFORMATION | SIGNAL TYPE INFORMATION | MOBILE STATION NUMBER INFORMATION |
|---|---|---|---|

FIG. 11C

| SIGNAL TYPE INFORMATION | MOBILE STATION NUMBER INFORMATION | IDLE SPEECH CHANNEL NUMBER INFORMATION (FREQ. CODE) |
|---|---|---|

FIG. 11D

| SIGNAL TYPE INFORMATION | MOBILE STATION NUMBER INFORMATION | SPEECH CHANNEL NUMBER INFORMATION (MBSNo.+CHNo.) |
|---|---|---|

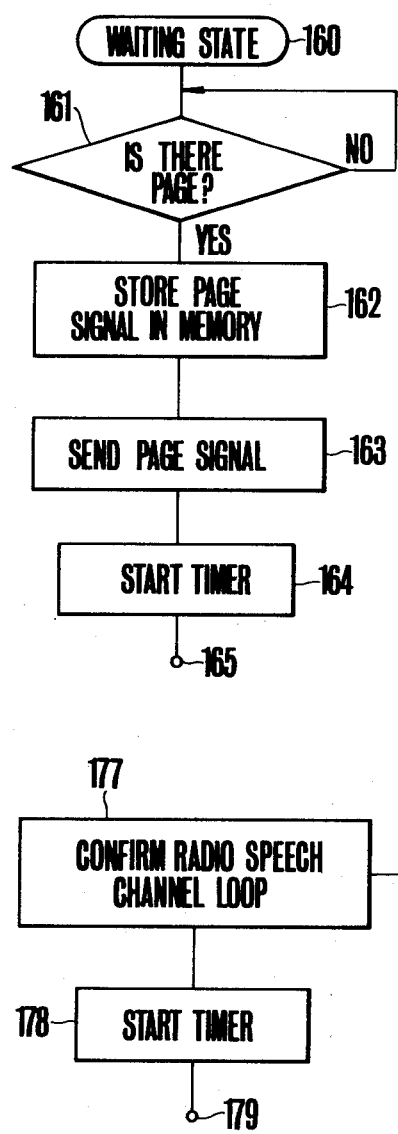
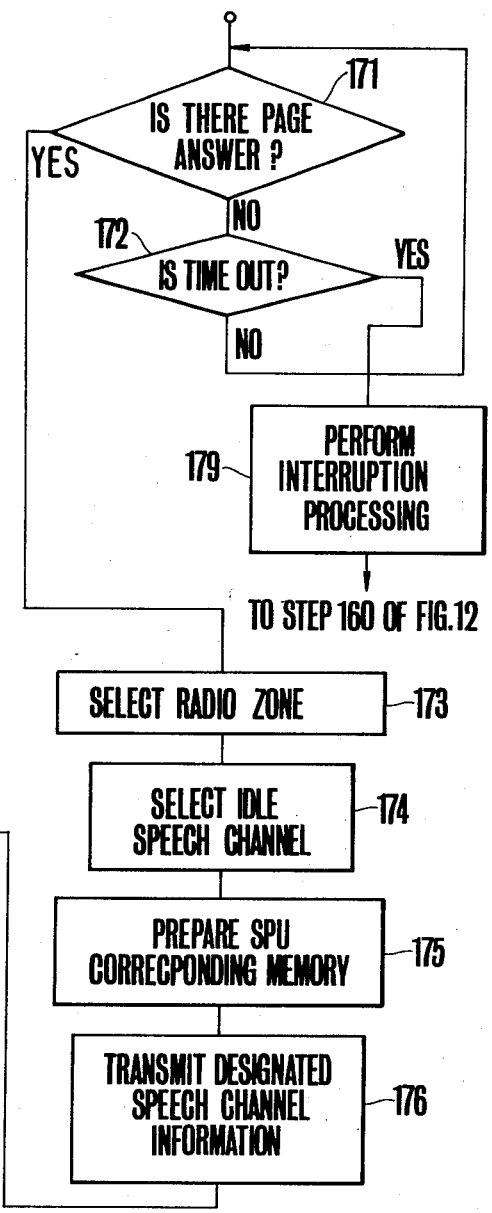

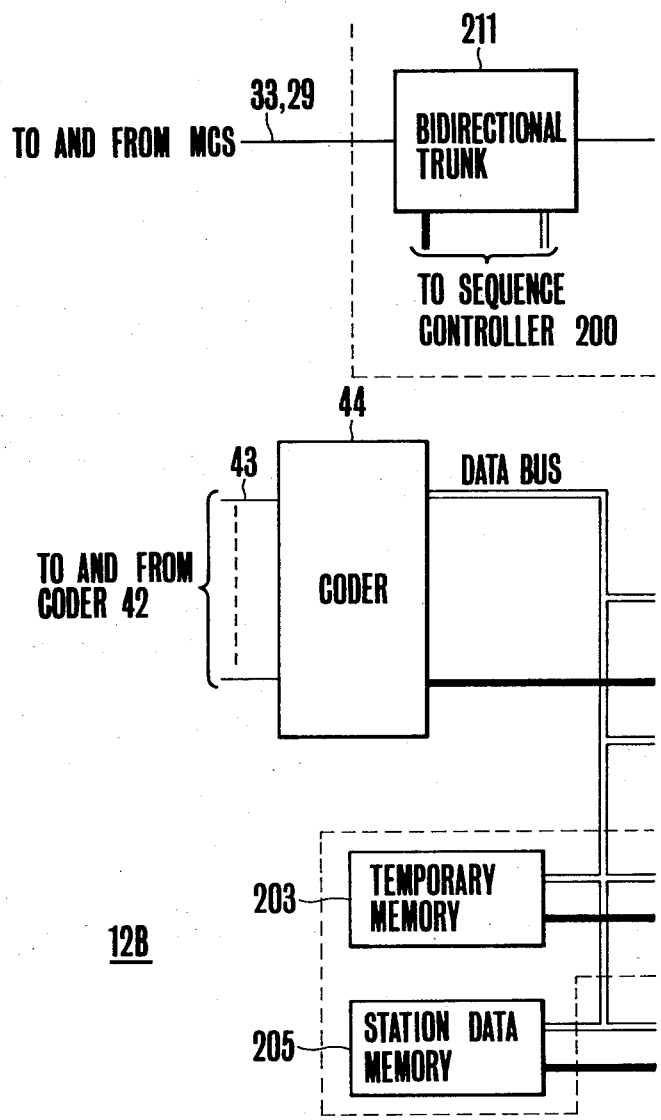

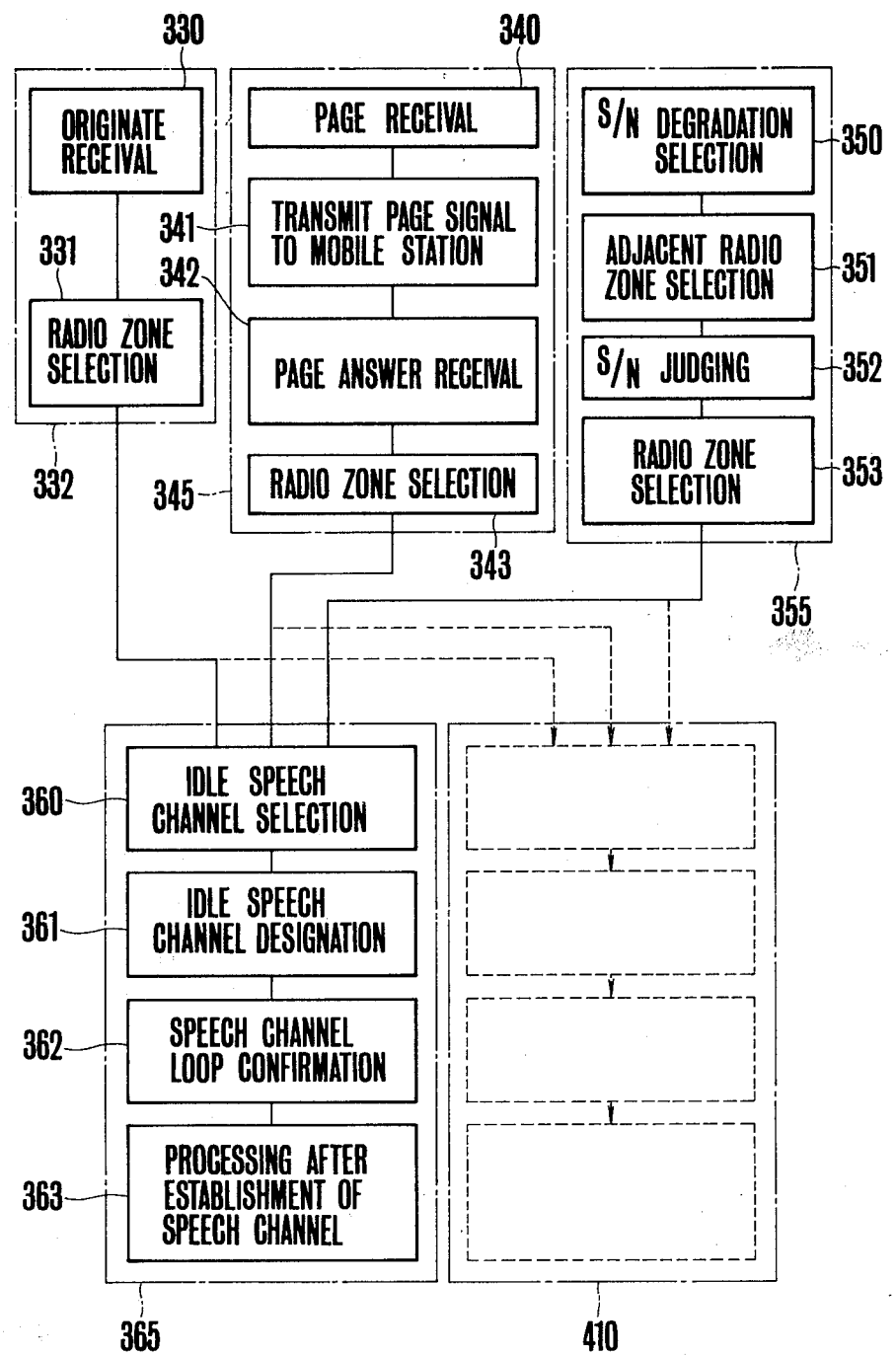

RADIO CHANNEL CONTROL SYSTEMS OF MOBILE RADIO TELEPHONE SYSTEMS

This is a continuation of application Ser. No. 801,022 filed May 26, 1977, now abandoned.

BACKGROUND OF THE INVENTION

This invention relates to a radio channel control system of a mobile radio telephone system.

Communication with motor cars, ships, trains or other vehicles by utilizing existing telephone network systems is increasing, and various types of mobile radio telephone systems have been developed to fulfil such communication requirements. In these systems the service area is divided into a plurality of radio zones, a mobile base station (MBS) is installed in each radio zone, each base station is connected to a control unit (MCU) through a common control channel and a speech channel. The communication is transferred to an ordinary telephone network from the control unit. The purpose of utilizing the common control channel is to increase the control efficiency thereby utilizing the speech channel at high efficiencies by commonly controlling a plurality of speech channels at high speeds where mobile communication services of a high capacity and over a wide area are contemplated. However, in the prior art since the control unit has only a single controller for controlling the channel switches and the radio channels there are various problems as presented below.

In the prior art, since the control of a subscribers memory device, the control of a speech channel memory device and the control of the radio service area, are made by a single controller, the process sequence of the controller is complicated thus requiring troublesome radio link design. Furthermore, when a radio channel system device and an exchange system device are controlled by a single controller, upon occurrence of a fault, determination of whether the fault is a radio system device fault or an exchange system device fault can be made only by extremely complicated which is time consuming. With a single controller, it becomes necessary to change the radio service area when the number of the motor car telephone subscribers increases, or when the construction of highways or buildings affects radio transmission. In order to change the radio service area, not only the radio system devices but also the exchange system device of the control unit must be changed. Therefore when the exchange system device and the radio system device are as in the prior art, by a single controller there are various problems as described above and the system lacks versatility.

SUMMARY OF THE INVENTION

It is therefore the principal object of this invention to provide a versatile radio channel control system of a mobile radio telephone system.

Another object of this invention is to provide a novel radio channel control system of a mobile radio telephone system that can readily discriminate and classify a failure of a radio system device and a failure of a switching (exchange) system device.

A further object of this invention is to provide an improved radio channel control system of a mobile radio telephone system capable of increasing the capacity of the radio telephone system.

Still further object of this invention is to provide a novel radio channel control system of a mobile radio telephone system capable of increasing the utilization factor of the system channels.

According to this invention, these and other objects can be accomplished by providing a mobile radio telephone system of the type wherein the service area of the system is divided into a plurality of radio zones, a plurality of base stations are installed in respective radio zones, each base station is connected to a control unit through a common control channel and a plurality of speech channels, and the control unit is connected to an ordinary telephone network, characterized in that the control unit comprises a exchange control unit provided with an exchange connector including a speech path switch and a radio channel control unit including a radio zone control system, and that the radio channel control unit and the exchange control unit include first and second sequence controllers, respectively, having independent functions, whereby information is provided to the base stations through the speech channels of the control unit and the control channels.

The second sequence controller for controlling the exchange control connector can be constructed to also process the information necessary toll charge control. Furthermore, after confirming the fact that a radio loop to a mobile station has been established, the second sequence controller sends information necessary for connecting the speech path and toll charge control. The first controller can receive and convert the signals between radio zones and correct error occurring between radio zones thus producing and sending only correct information.

In a modified embodiment, the control channels are classified into channels for mobile station originated calls and paging, and for switching speech channels when the mobile station moves into other radio zone. An independent sequence controller is provided for each one of the classified control channels, and a sequence controller is provided for controlling speech channels.

BRIEF DESCRIPTION OF THE DRAWINGS

Further objects and advantages of the invention can be more fully understood from the following detailed description taken in conjunction with the accompanying drawings in which:

FIGS. 3A, 3B and 3C are block diagrams showing the detail of the radio channel control unit for use in the radio channel control system shown in FIG. 2;

FIGS. 4A, 4B and 4C are block diagrams showing one example of the speech path unit (SPU) and the speech path unit controller shown in FIG. 3;

FIGS. 5A through 5D show examples of various signals utilized in the control unit at the time of call;

FIGS. 11A through 11D show examples of various signals utilized in the control unit at the time of a paging;

FIGS. 12 through 15 are flow charts showing the paging operation sequence of the control unit;

FIGS. 16A, 16B and 16C are block diagrams showing one example of an exchange control unit (exchange connector device or exchanger) of the control unit;

FIG. 22 is a block diagram showing a modified control unit of this invention and FIG. 23 is a flow chart showing the operation sequence of the system shown in FIG. 22.

DESCRIPTION OF THE PREFERRED EMBODIMENTS

The basic construction of the mobile radio telephone system of this invention will first be described.

THE PRINCIPLE OF THE SYSTEM

Figure 1:
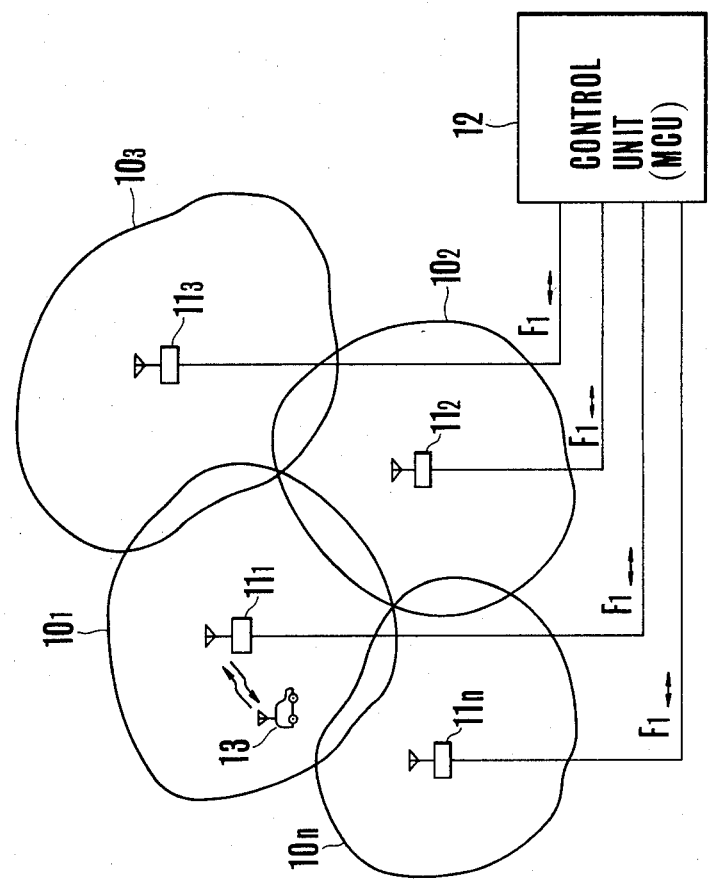
FIG. 1 is a diagram useful to explain the principle of the mobile radio telephone system to which the invention is applicable.

As shown in FIG. 1, the service area of the system is divided into n radio zones $10_1$ through $10_n$ and base stations $11_1$ through $11_n$ are installed in respective zones. Each radio zone has a radius of about 5 km, for example. In this example, the number of the radio zones is 4, and each ith base station $11_i$ (where i=1 through n) is allocated with speech channels $f_{i1}$ through $f_{im}$ where m represents an integer. These plurality of base stations $11_1$ through $11_n$ are commonly controlled by a control unit 12. Numeral 13 represents a mobile station. In this example, it is shown in the radio zone $10_1$.

The basic operation of this system will be described briefly with reference to FIG. 1. When a call is made by the mobile station 13, a call signal is originated therefrom through control channel $F_1$, and the call signal is received by all nearby base stations $11_1$ through $11_n$. In each base stations 11 a signal representing the intensity of the received field strength is added to the received signal and the sum is sent to the control unit 12. Normally, this unit 12 is in a condition for receiving a call signal, so that when it receives the call signal from the mobile station 13, the control unit 12 determines the strongest one of the signals sent from various base stations, and then searches for an idle speech channel in the base station from which strongest wave has been received. If there is an idle speech channel, the unit 12 designates an idle speech channel, for example $f_{11}$, of that base station and transmits information regarding the selected speech channel to all base stations $11_1$ through $11_n$ through the control channel $F_1$.

When a mobile station 13 receives the signal regarding the designation of the selected speech channel, the speech channel of the mobile station 13 is switched to channel $f_{11}$. The operation of the system described above is fully disclosed in U.S. Pat. No. 4,144,412 of the title "A method of assigning a radio channel to a calling mobile body of a mobile communication system and radio channel assigning system therefore", and corresponding to Japanese patent application No. 4720 of 1976.

RADIO CHANNEL CONTROL SYSTEM

Figure 2:
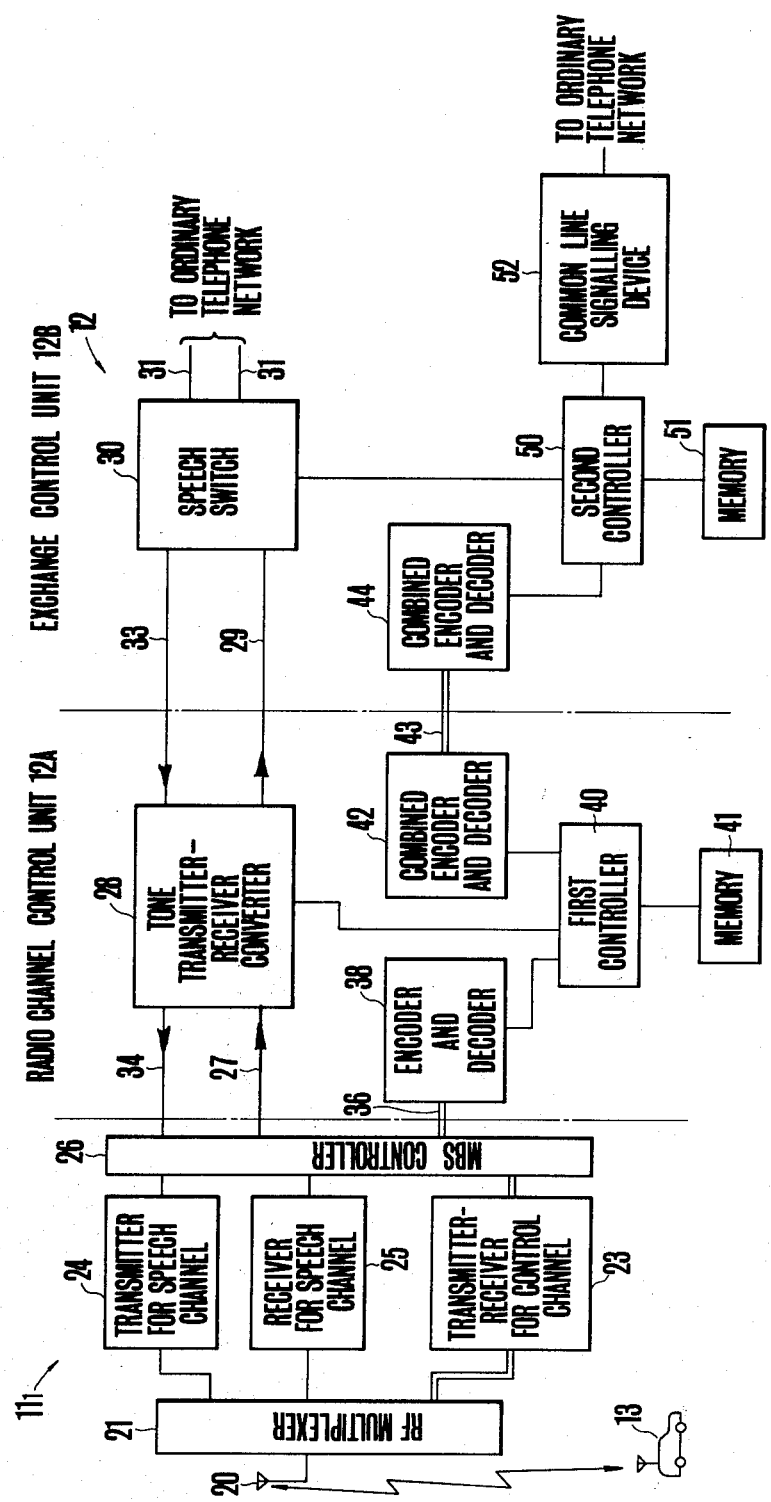
FIG. 2 is a block diagram showing the basic construction of the radio channel control system applicable to the system shown in FIG. 1.

This invention improves the control unit 12 of the mobile radio communication system shown in FIG. 1 by providing an independent sequence controller for a radio channel control unit 12A of FIG. 2 which has a radio channel system device, and another independent sequence controller for an exchange connection unit (an exchange control unit 12B) having an exchange connection system device of the control unit. FIG. 2 also shows a basic construction of a base station $11_1$ and the control unit 12. Since all base stations have the same construction the base station $11_1$ is taken as an example. The station $11_1$ is provided with an antenna 20 for transmitting and receiving through an RF multiplexer 21 an electric wave to and from the mobile station 13. The base station comprises a transmitter-receiver 23 for the control channel, a transmitter 24 and a receiver 25 for the speech channel and an RF multiplexer 21.

The receiver 25 for the speech channel is connected to a tone transmitter-receiver-converter 28 that constitutes a portion of the radio channel control unit 12A of the control unit 12 via an MBS controller 26 and a radio speech channel 27. The output 20 of transmitter-receiver converter 28 is coupled to a speech channel switch 30 which constitutes a portion of the exchange connection system 12B. The purpose of the speech channel switch 30 is to interconnect a speech channel 31 of an ordinary telephone network to a speech channel 33 for the radio communication. The speech channel switch 30 is connected to the MBS controller 26 through the speech channel 33, the tone transmitter-receiver-converter 28, the radio speech channel 34, and connected to the transmitter 24 for speech channel by preceding MBS controller 26.

The transmitter-receiver 23 for the control channel is connected to a combined first encoder and decoder (hereinafter termed a "coder") 38 of the radio channel control unit 12A via the MBS controller 26 and a radio control channel 36. According to this invention the coder 38 is connected to a first controller 40 which in turn is connected to a memory device 41 comprising a sequence memory device for effecting the sequence operation to be described later and a speech channel memory device. The controller 40 is also connected to a second combined encoder and decoder (also abbreviated as coder) 42. Also, the first controller 40 is connected to the tone transmitter-receiver-converter 28. The second coder 42 is connected to a third combined encoder and decoder (coder) 44 through a common control line 43. According to this invention, the third coder 44 is connected to a second controller 50 which in turn is connected to a memory device 51 including a sequence memory device for performing the sequence operation to be described later and a subscribers memory device. The second controller 50 is connected to the speech channel switch 30 described above and to a common line signalling device 52 connected to an existing control line. In FIG. 2 dual lines 36, 43 show that digital signals are transmitted therethrough.

The first and second controllers 40 and 50 which characterize the invention are constructed to independently control the operation of the radio channel system and the exchange connection system, and share the functions of the control unit 12 as shown in the following Table 1.

| Function | First controller 40 | Second controller 50 |
|---|---|---|
| Radio channel memory | o | |
| Subscribers memory | | o |

| Function | First controller 40 | Second controller 50 |
|---|---|---|
| Radio channel signal processing | o | |
| Conversion of radio channel signal into exchange connection signal | o | |
| Speech path exchanging | | o |
| Charge control | | o |
| S/N comparison of speech channel on radio channel side | o | |
| Sequence Memory | | o |

More particularly, the first controller 40 that controls the radio channel control unit 12A has access to the radio channel memory of the memory device 41 for processing the radio channel section signal thereby controlling the tone transmitter-receiver-converter 28 and the second coder 42 so as to convert a radio channel signal into an exchange connection signal.

When a mobile station moves into an adjacent radio zone during communication the speech quality or S/N ratio of the initial zone signal decreases. In such a case the first controller 40 judges the S/N ratio of the radio speech channel 27. If the S/N ratio of the radio speech channel decreases under a threshold level, the controller 40 selects a zone of highest S/N to which the signal channel is to be transferred and then assigns an idle speech channel of the base station of that zone.

The reason that the speech channel memory device 41 is placed under the control of the first controller 40 is that, since a speech channel is randomly selected independently of the ordinary telephone network where a call is made, it is necessary to store in the memory of the radio channel system which ones of the speech channels are idle and available for the next call and to control the connection of the radio channel only by the first controller.

The second controller 50 which controls the exchange connection system device provides access to the subscribers memory device of the memory 51 for providing a toll charge control thereby controlling the switching of the speech path switch 30 which connects the radio telephone system with an ordinary telephone network. The reason that the subscribers memory device is placed under control of the second controller 50 is that when a call is made, concurrently with the toll charge control, it is necessary to judge whether the call is made from a subscriber serviced by the radio telephone system or not, and when the subscriber is not serviced it is necessary to immediately terminate the service without operating the radio channel control system. The control of signal error in the radio channel is carried out by the first controller.

The signal processing operation of the system shown in FIG. 2 is as follows.

A call operation will first be described. When a mobile station originates a call the originating signal is received by the antennas of all base stations $11_1$ through $11_n$. Thus, in the mobile station $11_1$ the calling signal is received by antenna 20. The received calling signal is sent to the transmitter-receiver 23 for the control channel through the RF multiplexer 21. The originating signal contains a code representing the number of the mobile station. The transmitter-receiver 23 provides the S/N signal of the intensity of the received field and sends it and the originating signal code to the control unit 12 via the MBS controller 26 and the radio control channel 36.

The first controller 40 of the control unit 12 receives the output from the MBS controller 26 via the first coder 38 and processes the calling signal as follows. The first controller 40 selects the radio which provides an originating signal having the largest S/N ratio among the originating signals transmitted from the calling mobile station 13 and received by all base stations. Controller 40 then selects an idle speech channel of the base station unit of the selected radio zone, (that is an idle speech channel among the speech channels assigned to the base station of the radio zone) by accessing the idle speech channel memory 41. This operation is fully disclosed in said referenced patent. However, as these portions are not material to the basic operation of this invention detailed description thereof will not be made herein.

The first controller 40 also designates the same selected speech channel for the mobile station 13 from which it is receiving the originating signal. When the mobile station 13 receives the channel designation signal, it switches its speech channel to the designated channel.

Upon receiving the originating signal from the first controller 40, the second controller 50 controls the speech channel switch 30 interconnecting the radio communication system and the ordinary telephone network thereby connecting a dial receiver to the system. Thereafter, a dial signal sent from the mobile station through the selected speech channel is received by the first controller where it is checked and corrected for any error and then sent to the second controller 50 over a speech channel. At this time, the first controller 40 causes converter 28 to convert the signal received from the mobile station into a signal utilized in an ordinary telephone network, for example an MF (multi-frequency) signal, and then transmits the converted signal to the second controller 50.

After receiving all digits of the signal the second controller 50 causes the speech channel switch 30 to connect the radio system to the ordinary telephone network while at the same time controller 50 starts to register the toll charge.

The called party may be a mobile station. Then a processing similar to that where the calling party is a mobile station will be made as will be described later.

The operation when a paging is made to called mobile station by an ordinary telephone network will now be described.

When the second controller 50 detects that a paging is made by a subscriber of the ordinary telephone network to the mobile station 13, the controller 50 sends a page answer signal comprising a type code and the mobile station number to the first controller 40 via coders 44 and 42.

In response to this page signal the first controller 40 transmits another page signal to all base stations $11_1$ through $11_n$ through coder 38 and the same control channel, for example control channel F1. The base stations receive the page signal from the transmitter-receiver 23 for the control channel which transmits an electric wave containing the page signal through the RF multiplexer 21 and antenna 20.

When this electric wave is received by the mobile station 13 station 13 transmits a page answer signal.

When received by the antennas of base stations, the page answer signal is sent to control unit 12 via respective transmitter-receivers for the control 23. When the first controller 40 detects the page answer signal, the selection of the radio zone and the designation of the speech channel are made in the same manner as the call processing described above. Thereafter, the page answer signal is sent to the second controller 50.

As above-described, after the operations of S/N comparison, zone selection and channel speech designation are performed in the first controller 40, the following operation will be initiated.

When the second controller 50 receives the page answer signal through coder 42 and 44, it controls the speech channel switch 30 in accordance with the speech channel information from the coder 42.

Thereafter, the second controller 50 sends a ringback tone signal to the subscriber of the ordinary telephone network and the first controller 40 sends a ringing tone signal to the mobile subscriber. When the handset of the mobile station is off hooked, speech can be initiated. At the same time, the second controller 50 begins toll charge metering.

As above described according to this system, since the control unit controls the radio system device and the exchange connection system device by different controllers, it is possible to readily judge whether a fault has occurred in the radio system device or in the exchange connection system device. Furthermore, the controllers can independently control the radio system and the exchange connection system. Further, by isolating the radio system control from the exchange connection system control it is possible to readily change the radio service area and the signalling system utilized in the radio zones, thereby increasing the versatility.

DETAIL OF THE CONTROL STATION

To have better understanding of the invention, the detail of the control station will now be described with reference to FIGS. 3 and 4. As above described, the control station comprises a control unit (MCU) 12A which controls the radio system and a exchange unit (MEU) 12B which controls the exchange control system.

A. Control Unit (MCU) 12A

Figure 3A:
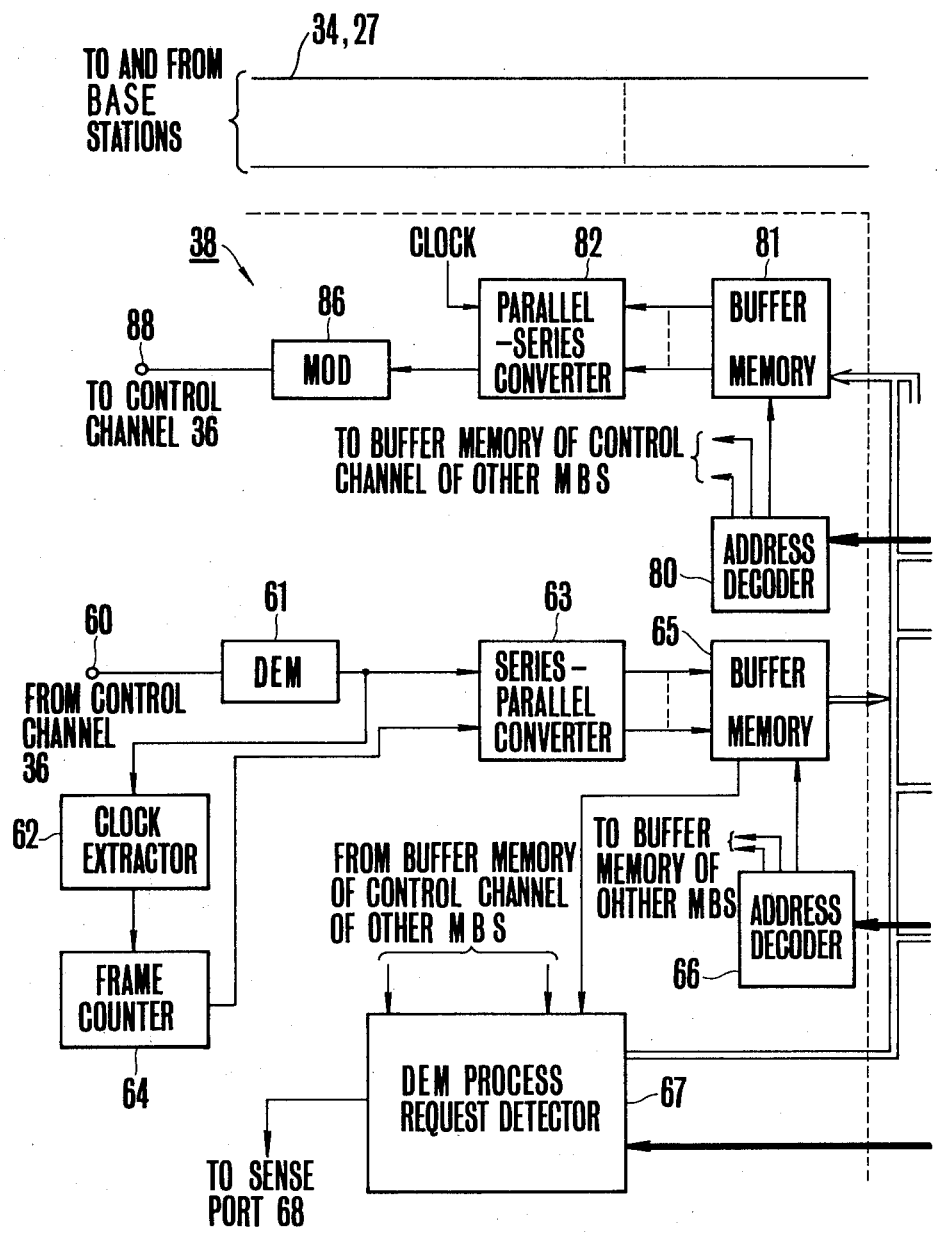

The construction of the control unit 12A of one base station is shown in FIG. 3. The signal transmitted from a mobile subscriber station and received by the transmitter-receiver 23 for the control channel of a base station is applied to a terminal 60 via the MBS controller 26 and the control channel 36 and thence to a demodulator 61 comprising the coder 38. The data control information demodulated by the demodulator 61 is sent to a clock extractor 62 and a series-parallel converter 63. The data control information has a format as shown in FIG. 5B, for example. The clock extractor 62 extracts the leading portion of the start information from the control information and when this leading portion is detected, a frame counter 64 begins to count a predetermined number of pulses. The count of the pulses shows an interval (frame) until the next information (in this example, mobile station identification number shown in FIG. 5B) is received. Upon receipt of the output from the frame counter 64, the series-parallel converter 63 performs series-parallel conversion of the data control information and the converter 63 output is stored in a buffer memory devices 65 which stores the mobile station identification number and the received signal level information. An address decoder 66 is provided for the purpose of transferring an information stored in the buffer memory device 65 to a temporary memory device to be described later according to a command from a sequence controller. When the above described information is stored in the buffer memory device 65, it sends to a DEM process request detector 67 a signal showing that a calling signal has been received from a mobile station. This DEM process request detector 67 also receives information from the buffer memory devices of the control channels of the other MBSs. The output from the DEM process request detector 67 is set to a sense port 68. A sequence controller 70 constantly scans the sense port 68 so as to check whether or not a signal has been received from the DEM process request detector 67 or not through the sense port 68. When the sequence controller 70 detects that a request has been made by the DEM process request detector 67 and by the scanning action of the sense port 68, the sequence controller 70 makes an address designation of detector 67 to read the output of the detector 67 thus judging that the request has originated from a specific one of the base stations.

Upon receipt of the signal from the DEM process request detector 67, the sequence controller 70 determines that the detected signal has originated from a specific one of the base stations and then transmits to a temporary memory device 72 an address information together with a received signal level information and an identification number information. The temporary memory device 72 stores all information received from respective base stations in accordance with a predetermined sequence determined by a sequence memory device 73. The control unit 12A includes the above described temporary memory device 72, the sequence memory device 73, and a station data memory device 74 which stores fixed information such as frequency codes corresponding to the speech channels. The temporary memory device 72 includes a call table memory device which stores information regarding the call from a mobile station, an SPU corresponding memory device to be described later, a timer table memory device, etc., and these memory devices are allocated to the table memory device during the sequential operation of the sequence controller 70 to be presented herein. The sequence controller 70 selects an information corresponding to a radio zone or a base station having the strongest intensity of the received wave among the information stored in the temporary memory device 72 in accordance with the sequence stored in the sequence memory device 73. The selection operation is described in detail in said referenced patent. Then the sequence controller 70 checks the speech channels belonging to the selected radio zone to determine whether there is an idle speech channel or not. This check operation is made according to the content of an idle speech channel memory device that forms a portion of the temporary memory device 72. The renewal of the information stored in the idle speech channel memory device is made in accordance with information from an SPU to be described later.

The sequence controller 70 adds the detected idle speech channel information to information which has been stored as a station data and has been converted into a radio frequency code according to the radio frequency table and to information regarding a mobile station identification number which has been temporarily stored in one portion of the temporary memory device 72 and sends the sum signal through the following path as a channel designation information. More particularly, the sequence controller 70 sends an address information that designates a data channel to an address decoder 80 which constitutes the coder 38 in accordance with the sequence stored in the sequence memory 73 thereby sending the information regarding the mobile station identification number and the idle speech channel which has been stored in the temporary memory device 72 to a buffer memory device 81 via a data bus line. As shown in FIG. 5C, the information stored in the buffer memory device 81 comprises a signal type information and succeeding identification number information and an idle speech channel information.

When information is stored in the buffer memory device 81, this information is then sent to a parallel-series converter 82 which performs a parallel-series conversion in response to an external clock signal corresponding to the signal in the radio zones and applies the converted signal to an output terminal 88 via a modulator 86. The signal supplied to the output terminal 88 is sent to the base stations $11_1$ through $11_n$ via control channel 36.

Concurrently with the operation described above, the sequence controller 70 designates a speech path unit (SPU) address corresponding to the speech channel and sends the address signal to an SPU controller 90 over an address bus line. Then by the address designation information from the sequence controller 70, the SPU controller 90 selects one of SPU $91l$ ($l=1$-p), thereby confirming a speech channel loop to a mobile subscriber station through the SPU $91l$.

Thereafter, the sequence controller 70 makes an access to a timing circuit 85 to start a timer, not shown, so as to judge whether the mobile station has replied or not within a predetermined interval. The purpose of the timer is to count the number of the timing pulses supplied from an external clock by a number preset by an information from the data bus line and to judge whether the count has reached a predetermined value or not. The timer is comprised of by a preset timer, not shown, and a portion of the temporary memory device 72, and the address of the SPU utilizing the timer is set in the time table in the temporary memory device 72. Furthermore, the sequence controller 70 forms a memory table corresponding to the SPU in the temporary memory device 72. The memory table contains the SPU address, the mobile station identification number, the timer table number, a signal representing present state, and an address storing an order to be executed next time. The signal representing the present state includes signals indicating that the speech channel loop confirmation is now being made, that a call signal is now being sent to to the second controller and that a paging processing is now being made.

A series of operation described above is shown by a flow chart shown in FIG. 7.

Figure 6:
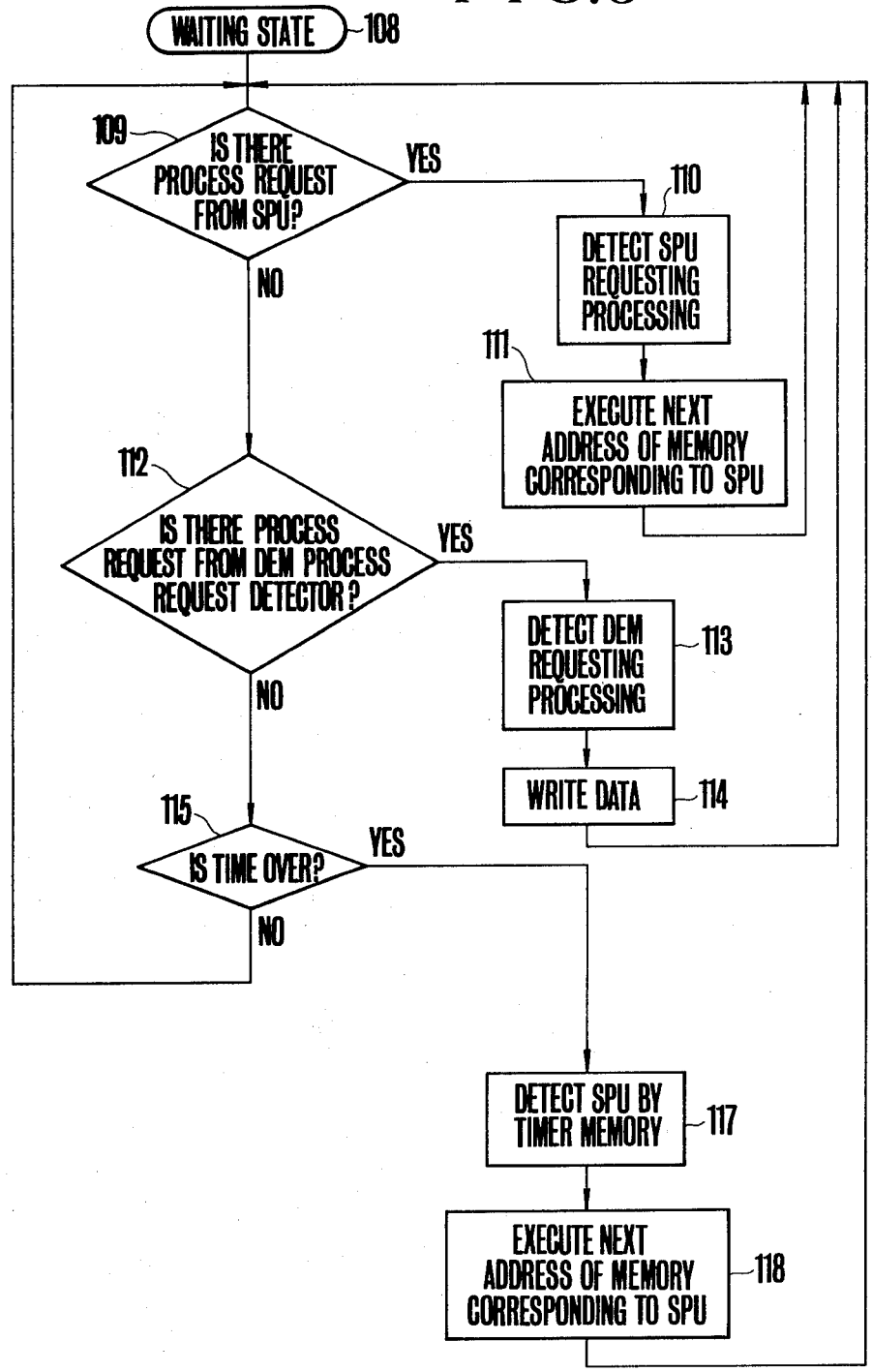
FIG. 6 is a flow chart showing the operation sequence of the sequence controller of the control unit.

Before describing the flow chart, the sequence operation during the waiting time of the sequence controller 70 will first be described with reference to the flow chart shown in FIG. 6. As above described, the sequence controller 70 constantly scans the sense port 68 for supervising what process request is made and if what type.

Thus, the sequence controller 70 is normally in the waiting state shown by 108. When a process request from SPU is detected by the sense port 68 as above described the sense port 68 receives the information from the SPU unit 90 (step 109) and judges that the process request comes from a specific one of the SPU (step 110). At step 110, an address decoder (93 shown in FIG. 4 for example) is sequentially designated to determine that the signal comes from the specific one of the SPU. When an SPU that made a process request is determined, the next memory address corresponding to that SPU is executed (step 111), thus restoring again the waiting state.

Furthermore, by scanning the sense port 68, the sequence controller 70 judges that there is a process request detected by the DEM process request detector (step 112) for determining that the detected process request is sent from a specific one of the demodulators (step 113). The step 113 is executed by sequentially designating an address decoder (66, for example), whereby the content of the buffer memory (65, for example) is read out and the read out content is stored in the temporary memory device (step 114). When the data writing operation is finished, the waiting state is restored.

When the sequence controller 70 comes to know that there is a process request from the timing circuit 85 (in this example, is time over?, step 115) by scanning the sense port 68, the sequence controller 70 detects a corresponding SPU by using the timer memory (step 117) and executes the next address of the corresponding memory device of that SPU (step 118). Then the operation is returned again to the waiting state.

Further, by scanning the sense port 68, the sequence counter 70 supervizes whether a signal was obtained in one of the steps 109, 112 and 115 or not, and when a signal is obtained, the waiting state 108 is resumed again thus repeating the same.

The detail of the operation of the sequence controller 70 corresponding to respective sequences are as follows.

Figure 7:
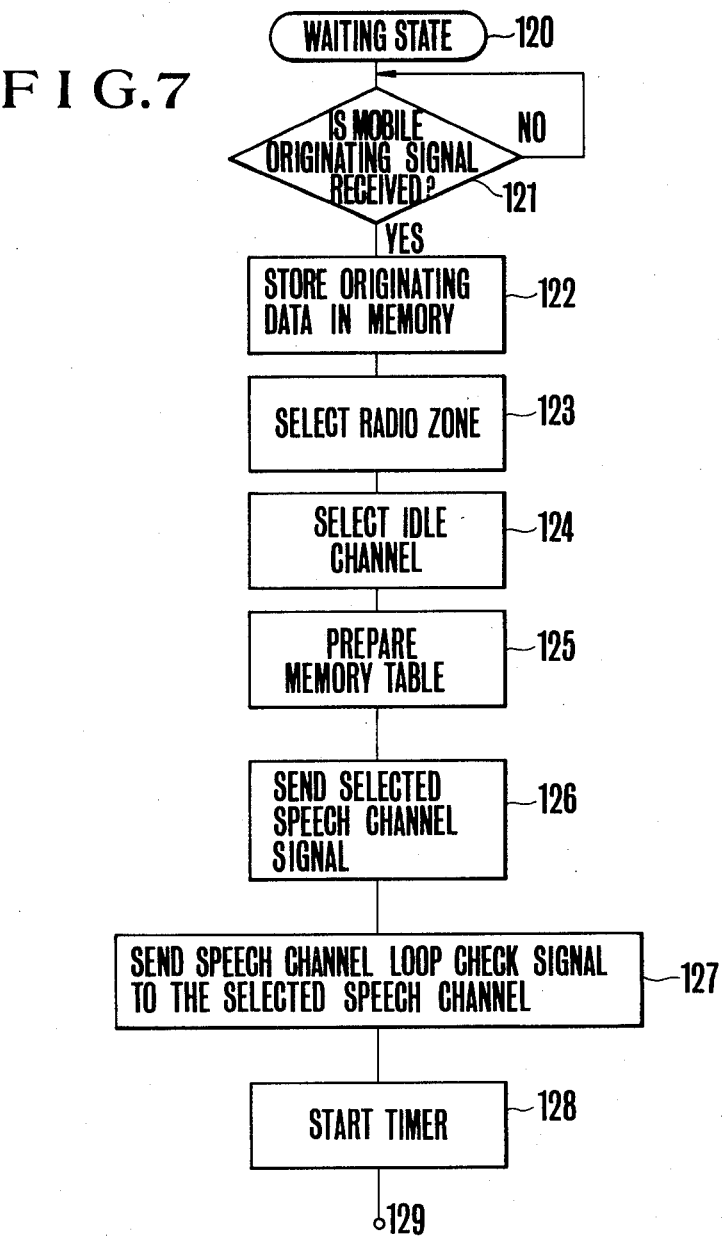
FIGS. 7 through 10 are flow charts showing the originating operation sequence of the mobile control unit.

FIG. 7 is a flow chart showing a sequence of detecting a call from a mobile station by the sequence controller 70 until a designation of a speech channel is made by the sequence controller.

Normally, the sequence controller 70 is in the waiting state 120. When a off-hook state is reached by off-hook the handset of a mobile station 13, it transmits a signal as shown in FIG. 5A. In response to this signal all base stations $11_1$ through $11_n$ add a signal representing the intensity of the received signal to the received signal to form a signal shown in FIG. 5B and transmit it to the control units 12A of the control stations 12.

When a control unit 12A detects that the sequence controller 70 has received a mobile originating signal from the mobile station 13 (step 121), the originating signals from all mobile base stations are stored in the temporary memory device 72 through respective buffer memory devices (step 122). Then the sequence controller 70 selects one information having the strongest received signal level among the information stored in the temporary memory device 72 and determines that a base station (for example $11_1$) which has received the selected information is to communicate with the originating mobile station (step 123). Then, the sequence controller 70 selects an idle speech channel among the speech channels belonging to the selected base station $11_1$ (step 124).

When an idle speech channel is designated, the sequence controller 70 commences to prepare a memory table corresponding to the SPU (step 125). When this table is formed, the sequence controller 70 commands to all base stations that a speech channel designation signal as shown in FIG. 5C should be transmitted to the mobile subscriber station (step 126). Concurrently therewith, the sequence controller 70 command the corresponding SPU that a speech channel loop check tone should be transmitted to the selected speech channel (step 127). Then the sequence controller 70 returns to the waiting state (step 129) by starting a timer (step 128).

Figure 8:
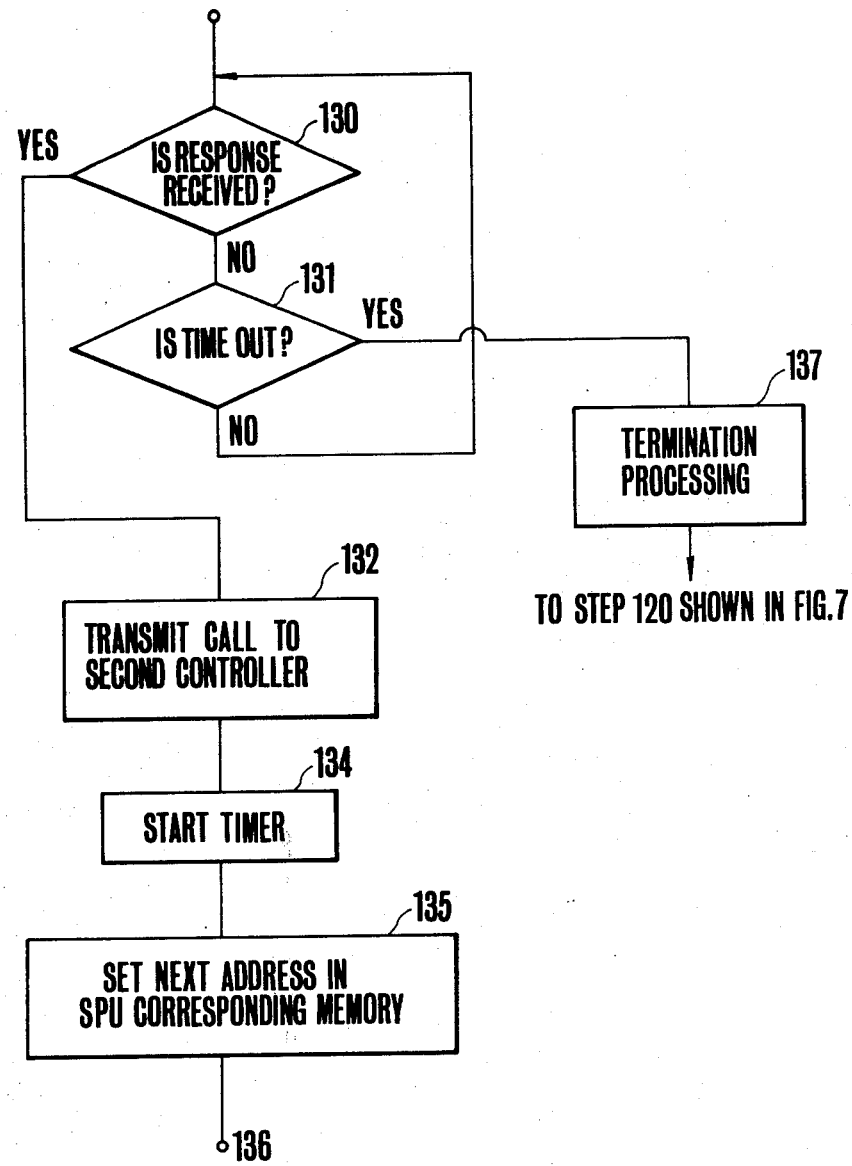

FIG. 8 is a flow chart showing the sequences executed by the sequence controller 70 after completion of the operations shown in FIG. 7. These steps are commenced by sending a "time out" signal from a timer which has been started at step 128 shown in FIG. 7, or by receiving a reply signal from a mobile station in response to said speech channel loop check tone or loop confirmation signal sent to the mobile station in step 127 shown in FIG. 7. Such input conditions are determined by steps 130 and 131.

When either one of the input conditions is satisfied, the sequence controller 70 reads a memory corresponding to the SPU to execute the succeeding processing steps stored in the next address. More particularly, when a reply from a mobile station is received by an SPU the step is advanced to step 132, so that the sequence controller 70 transmits a signal indicating that a call has been made to the second controller 50 via coder 42. As shown in FIG. 5D, this call signal is constituted by a signal type information, a mobile station identification number information and a speech channel number information including a base station number information and a selected speech channel number information. The coder 42 has the same construction as the coder 38 shown in FIG. 3. Although coder 38 exchanges information with the control channel 36, coder 42 is connected to the common control line 43 for exchanging information with coder 44 of the exchange connector 12B.

The sequence controller 70 transmits the call signal to the exchange connecting system through coder 42 (step 132).

When this operation completes, the sequence controller 70 is combined with the temporary memory device 72 so as to set a new timing value in the preset counter of the timing circuit 85. When the connection is established a timer of one SPU is used to commence the counting operation of the pulses from the timing circuit 85 (step 134).

Thereafter, the sequence controller 70 advances to step 135 for changing the "state" of the memory table corresponding to an SPU previously formed to the "next address" to prepare for the reply from the exchange connector 12B.

In step 131, in the absence of a reply from a mobile station within a predetermined time, the sequence controller 70 advances to step 137 for processing termination. When the termination processing is over, the sequence controller 70 returns to the waiting state shown in FIG. 7 (step 120).

Figure 9:
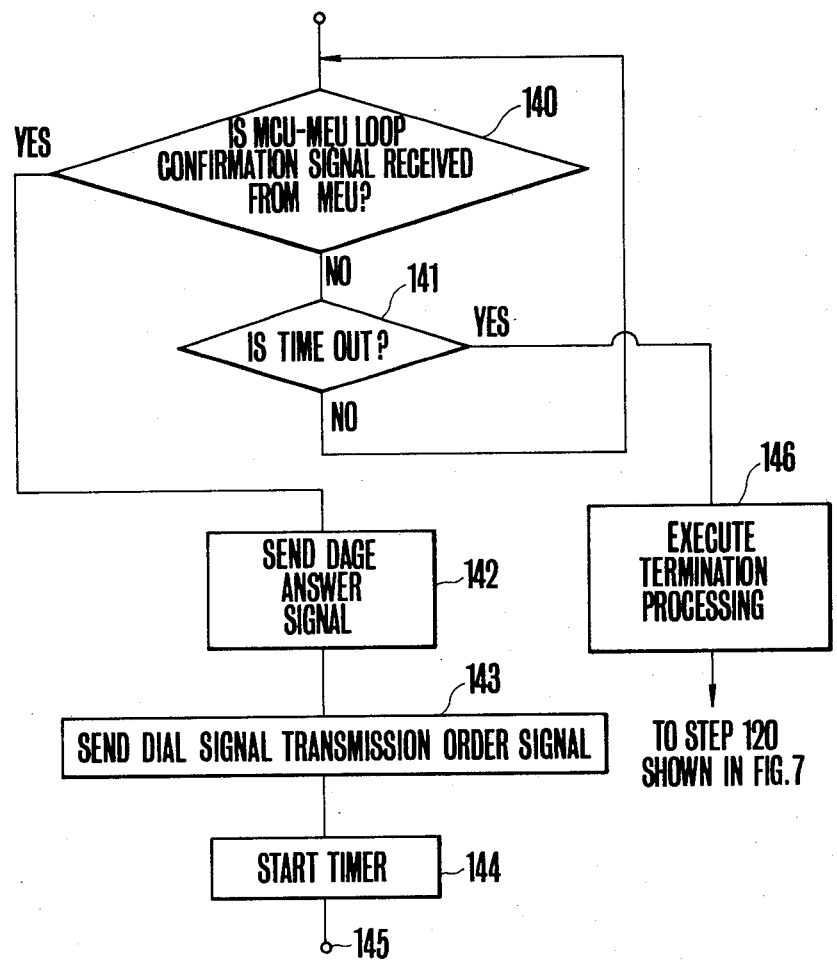

The steps shown in FIG. 9 are executed after the sequence controller 70 has finished the operations shown in FIG. 8. The input conditions to these steps is satisfied when the timer which has started in step 134 shown in FIG. 8 produces a time out signal or when a loop confirmation signal is received from MEU 12B. Such input conditions are determined by steps 140 and 141.

When either one of the input conditions is fulfilled the sequence controller 70 scans the SPU corresponding memory device (in the case of time out the SPU corresponding memory device of the timer memory device) to proceed to the subsequent processing steps. Thus, in response to the MCU-MEU loop confirmation signal (step 140), the sequence controller 70 advances to a next processing step 143 to control the SPU controller 90 thereby sending a dial signal transmission order signal to the speech channel to receive a dial signal from a mobile station. Thereafter the sequence controller 70 advances to a step 144 for starting the timer, thereby returning to the waiting state 145.

In a state waiting for the MCU-MEU loop confirmation signal from MEU 12B, if there is not time out the timer memory scans the SPU corresponding memory device to advance to step 146 from step 141 thus processing the termination of that SPU. Thereafter the step returns to step 120 shown in FIG. 7.

Figure 10:
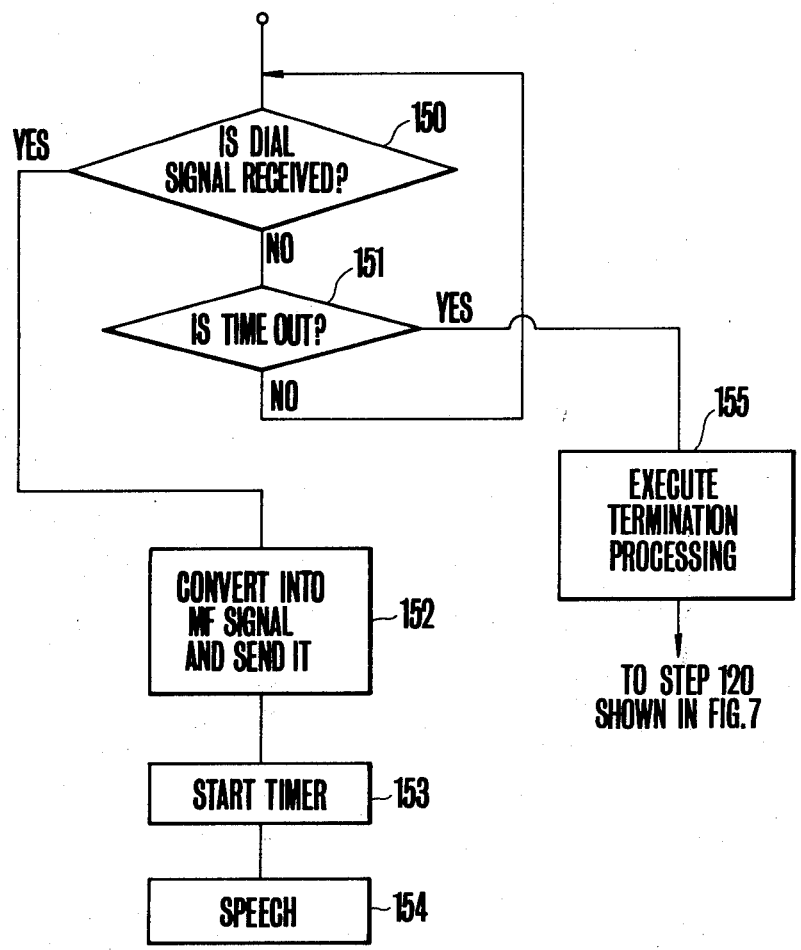

The sequences shown in the flow chart shown in FIG. 10 are executed after the sequence controller 70 has completed the operations shown in FIG. 9. The input conditions to these steps are satisfied when a timer which has started in step 144 shown in FIG. 9 sends a time out signal and when a dial signal is received from a mobile station, and these input conditions are determined by steps 150 and 151.

A dial signal received from a mobile station is used to convert serial push button (PB) signals into a multi-frequency signal which is used in ordinary network (step 152) in SPU 91. In step 152, if the serial push button dial signals contain an error, such error will be corrected when they are converted into the multi-frequency (MF) signal. The construction and operation of SPU 91 will be described later. When step 152 is executed, the timer is started again (step 153), so that a speech can be commenced (step 154) when the ordinary telephone network from MEU 12B is connected and when an information showing that the called party has responded. Then the originating operation of the sequence controller 70 terminates.

When a dial signal is not transmitted from a mobile station within a predetermined interval the step is advanced from step 151 to step 155 thus performing the termination processing. Thereafter, the process returns to the step 120 shown in FIG. 7.

When a page is made, the sequence controller 70 of the control unit 12A operates as follows. When a page arrives, the sequence controller 70 operates according to a sequence as shown in FIG. 12 and stored in sequence memory 73. A page signal sent from the exchange connector 12B through coder 44, common control line 43 and coder 42 comprises a signal type information showing that the signal is a page signal and a mobile station identification number information as shown in FIG. 11A. The sequence controller 70 in the waiting state (step 160) responds to the page signal (step 161) by storing it in a page signal memory device of the temporary memory device 72.

Then, the sequence controller 70 proceeds to step 163 to access to the address decoder 80 of coder 38 to store an information shown in FIG. 11A in the buffer memory device 81 via the data bus line. The content stored in the buffer memory device 81 is sent to the parallel-series converter 82 in which a signal shown in FIG. 11B is formed by utilizing an external clock pulse corresponding to the signal velocity in the radio zones, and the signal is sent to the control channel 36 via the demodulator 86 and the output terminal 88. When transmission of the page signal terminates the sequence controller 70 operates the timer (step 164) whereby the sequence controller again returns to the waiting state (step 165). The page signal transmitted to the base stations via the control channel is radiated simultaneously from all base stations.

When a mobile station 13 is in any one of the radio zones of the base stations, the mobile station 13 receives the page signal and transmits a page answer signal. As shown in FIG. 11B, the page answer signal comprises a preamble information, a start information, a signal type information which differentiates a call signal from a page signal, and a mobile station identification number information. Thus, the page answer signal has the similar construction as the originating signal (FIG. 5A) at the time of an originating operation.

The page answer signal appears on the terminal 60 of coder 38 of the control unit 12A via a mobile base station and a control channel and is processed in the same manner as the originating operation. When an output is produced on DEM process request detector 67 from the buffer memory device 65, the sequence controller 70 begins the sequential operation shown in FIG. 13.

The input conditions to the sequential operation shown in FIG. 13 are satisfied when the timer that has started in step 164 shown in FIG. 12 produces a time out signal and when a page answer signal is received from a mobile station in response to a page signal sent to the mobile station in step 163 shown in FIG. 12 and these input conditions are determined by steps 171 and 172.

When a page answer signal is received, the sequence controller 70 advances to step 173 and selects a page answer signal having the highest received signal level among the page answer signals sent from all base stations so as to determine which one of the radio zones is to be used for communicating with the mobile station. Step 173 corresponds to step 123 shown in FIG. 7 where a mobile station makes an originating call. The steps following this step corresponds to those shown in FIG. 7. When a radio zone is determined, the sequence controller 70 advances to the next step 174 in which an idle speech channel is selected.

Upon designation of an idle speech channel, the sequence controller 70 starts to prepare an SPU corresponding memory table (step 175). When the memory table is prepared, the sequence controller 70 commands to send a speech channel designation information as shown in FIG. 11C to the base stations (step 176). At the same time, the sequence controller 70 confirm, a speech channel in the radio zones (step 177). Upon termination of this step, the sequence controller 70 starts the timer (step 178) and then returns to the waiting state (step 179).

At the time of the page answer detection operation, when a time out occurs, the step is advanced from step 172 to step 179 thus performing a termination processing. Thereafter the controller returns to step 160 shown in FIG. 12.

Figure 14:
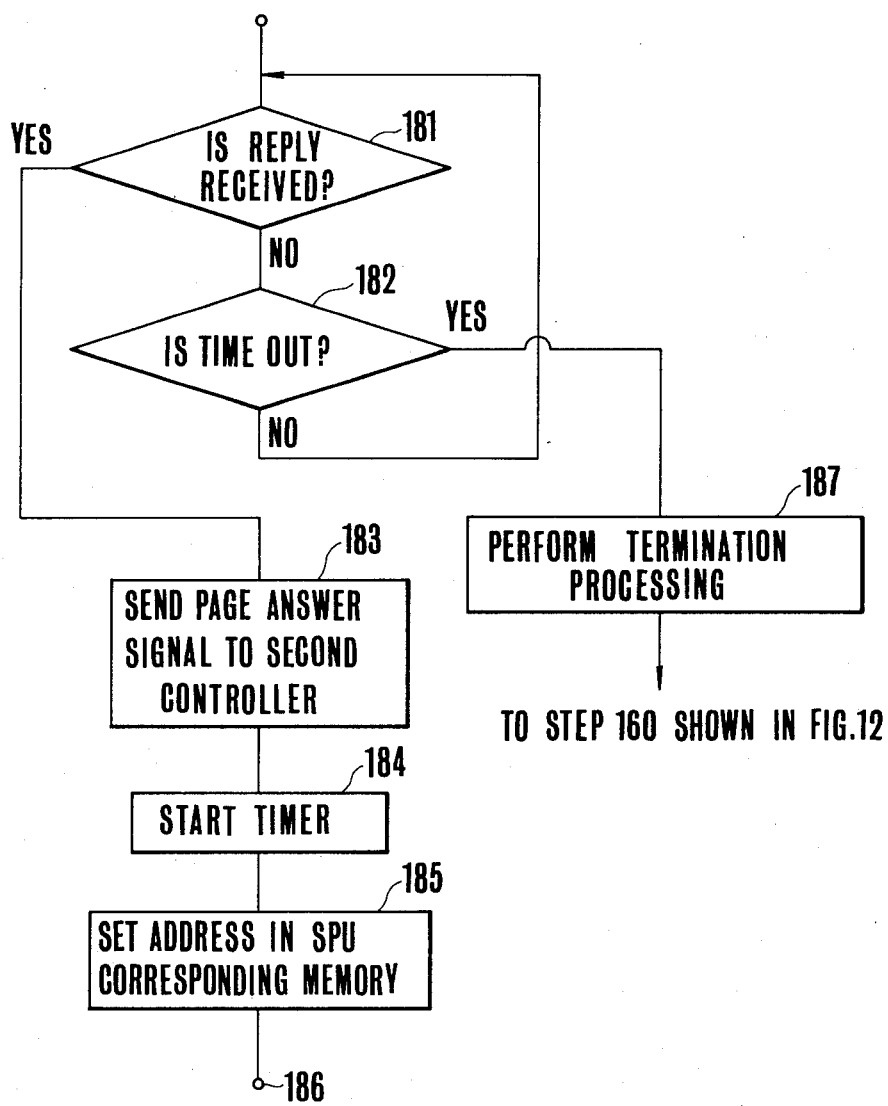

The sequences shown in FIG. 14 are executed after the sequence controller 70 has completed the operation shown in FIG. 13. This step is the same sequence shown in FIG. 8 which was described for an originating operation. The input conditions to these sequences are fulfilled when a timer started in step 178 produces a time out signal and when an answer signal is received from a mobile station in response to a loop confirmation signal sent to the mobile station in step 177 shown in FIG. 13. These input conditions are determined by steps 181 and 182.

When either one of the input conditions is satisfied, the sequence controller 70 scans the SPU corresponding memory table to advance to the following processing steps. When the answer from the mobile stations is received by SPU 91, the step is advanced to step 183 and the sequence controller 70 sends to the second sequence controller 50 a signal showing that a page answer was made. As shown in FIG. 11D, the page answer signal comprises a signal type information, a mobile station identification number information, and a speech channel number information including a mobile base station number information and a selected speech channel number information. When the sequence controller transmits a page answer signal, a timer is started (step 184) to set the next address in the SPU corresponding memory device (step 185) and then advances to the waiting state (step 186).

If there is no answer from the mobile station within a predetermined interval in step 182, the sequence controller 70 advances to step 187 thus performing a termination processing. Then the sequence controller 70 returns again to step 160 shown in FIG. 12.

Figure 15:
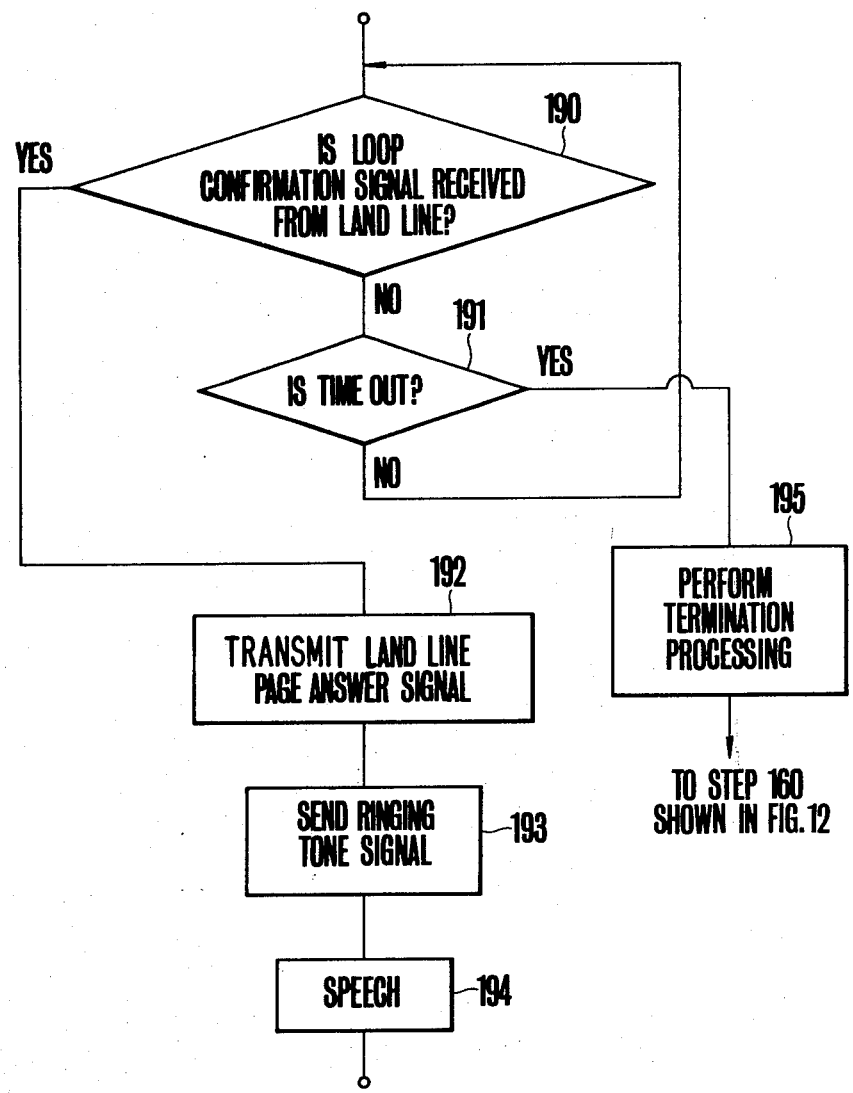

The sequences shown in FIG. 15 are executed when the sequence controller 70 completes the operations shown in FIG. 14. The input conditions to these sequences are satisfied when a timer started in step 184 produces a time out signal and when an ordinary telephone loop confirmation signal is received from the second controller 50 through a speech channel after the second controller 50 of the exchange connector 12B has received a page answer signal in step 183 shown in FIG. 14. These input conditions are determined by the steps 190 and 191.

When either one of the input conditions is satisfied the sequence controller 70 scans SPU corresponding memory device (in the case of a time out the timer memory device scans the SPU corresponding memory device) thereby advancing to the succeeding processing steps.

More particularly, when the SPU 91 receives a MEU-MCU loop confirmation signal from the exchange connector 12B via a speech channel, the SPU 91 transmits this signal to the sequence controller 70 via the SPU controller 90. When the sequence controller 70 confirms that it has received the confirmation signal it commands to send a MEU-MCU loop page answer signal to the SPU 91 via SPU controller 90 thus informing that the control unit 12A has received the page answer signal from the exchange connector 12B.

Thereafter, the sequence controller 70 transmits a ringing tone signal to the base stations through a speech channel (step 193) thereby enabling speech when the handset of the mobile station is off-hook (step 194).

When a page answer signal is not produced during a predetermined interval the sequence controller 70 advances to step 195 from step 191 thus making a termination processing, and then return to step 160 shown in FIG. 12.

B. Speech Path Unit (SPU) and SPU Controller:

Concrete examples of a speech path unit 91 and an SPU controller are shown in FIGS. 4A, 4B and 4C. The purpose of SPU 91 is to check whether a speech channel loop is established between mobile stations via mobile base station or not, to convert a serial dial signal into an MF signal, to correct an error in the serial dial signal, during the conversion process and to confirm that a speech channel loop has been established to a exchange unit (MEU). The SPU controller 90 is combined with the sequence controller 70 to control the operations described above.

As shown in FIG. 4, the SPU controller 90 is provided with an address decoder 93 for decoding an address information sent from the sequence controller 70. The output from the address decoder, 93 is supplied to a gate circuit 95a which controls the output of an oscillator 94a ($OSC_1$) which generates a signal for confirming a speech channel loop to a mobile station, for example 13. When the output from the address decoder 93 is supplied to the gate circuit 95, the output of the oscillator 94a is supplied to a corresponding base station via speech channel 34. This operation corresponds to step 127 shown in FIG. 7 and step 177 shown in FIG. 13. Also the output of the address decoder 93 is applied to a gate circuit 95b which controls an oscillator 94b ($OSC_2$) which produces a signal indicating that a speech channel loop confirming signal has been received when it is sent from a mobile exchange unit (MEU) of a receiving unit to be described later. When the output of the address decoder 93 is applied to the gate circuit 95b and the output of the oscillator 94b is sent to a mobile exchange unit via a speech channel 29. This operation corresponds to step 142 shown in FIG. 9 and step 190 shown in FIG. 15.

The SPU 91 is provided with a receiving unit 96a ($REC_1$) connected to receive a page answer signal from the mobile station 13 through an MBS indicating that a speech channel loop confirmation signal has been received. The output of the receiving unit 96a is supplied to the set terminal of a flip-flop circuit 97a which is used to hold the output. Then, the Q output of the flip-flop circuit 97a is sent to one input of an AND gate circuit 98a which produces a logical product of said Q output and the output of the address decoder 93 which is produced when the address decoder 93 receives a signal (not shown in the embodiment described above) from the sequence controller 70 after the oscillator 94a has sent a speech channel loop confirmation signal to the mobile station. The logical product output of the AND gate circuit 98a is sent to a sense port 68 via a coder 99 and a process request detection circuit 100 which are connected in parallel. When the process request detection circuit 100 receives the output from the AND gate circuit 98a, the fact that a speech channel loop to the mobile station has been established is confirmed. Normally the sequence controller 70 is scanning the sense port 68 so that when the sequence controller 70 detects a process request the address of the coder 99 is designated through an address bus line for reading the content of the coder 99 via a data bus line. This operation corresponds to step 130 shown in FIG. 8 and step 171 shown in FIG. 13.

Furthermore, the SPU 91 is provided with a receiving unit 96b ($REC_2$) connected to receive a speech channel confirmation signal from the mobile exchange unit. The output of the receiving unit 96b is applied to the set terminal of a flip-flop circuit 97b which holds said output and the Q output of this flip-flop circuit is applied to one input of an AND gate circuit 98b. This AND gate circuit produces a logical product of the Q output of the flip-flop circuit 97b and the output of the address decoder 93 which is produced when it receives a signal (not shown in the above described embodiment) sent from the sequence controller 70 when it turns the receiving unit 96b to a waiting state through the coder 42 shown in FIGS. 2 and 3 (corresponding to step 130 shown in FIG. 8, and step 186 shown in FIG. 14). The logical product output of the AND gate circuit 98b is also sent to the sense port 68 via the decoder 99 and the process request detector 100. Application of the output of the AND gate circuit 98b upon the process request detector 100 means that the establishment of a speech channel loop to the mobile station has been confirmed. When sequence controller 70 detects this output via the process request detector 100 and the sense port 68 the address of coder 99 is designated by address decoder 93 constituting the SPU controller 90 via an address bus line, thus reading out the content of coder 99 through the data bus line. This operation corresponds to step 140 shown in FIG. 9 and step 190 shown in FIG. 15. Flip-flop circuits 97a and 97b are reset at a suitable time by an output from the address decoder 93 in response to a control signal sent from the sequence controller 70.

The SPU 91 is also provided with dial signal receiving units $102_0$ through $102_9$ ($PBREC_0$ through $PBREC_9$) which are connected to receive push button dial signals sent from the mobile station 13. These receiving units receive low and high frequency signals respectively corresponding to dial digits 0 through 9. The outputs of these receiving units are applied to the set terminal of flip-flop circuits $103_0$ through $103_9$. The Q outputs of these flip-flop circuits are applied to gate circuits $104_0$ through $104_9$ respectively, which control the supply of the outputs of multi-frequency oscillators $105_0$ through $105_9$ ($MFOSC_0$ through $MFOSC_9$) to the speech channel 29 leading to the mobile exchange unit. The timing of the signals passing through these gate circuits are controlled by a timing circuit 106 (TC) so as to match with the timing of the ordinary telephone network. This operation corresponds to step 143 shown in FIG. 9.

Gate circuits 107a and 107b are connected in series with the speech channel extending between a base station and a exchange unit and are controlled by a signal from the address decoder 93. These gate circuits are enabled at the time of commencing the speech and disenabled upon termination of the speech.

Figure 16B:
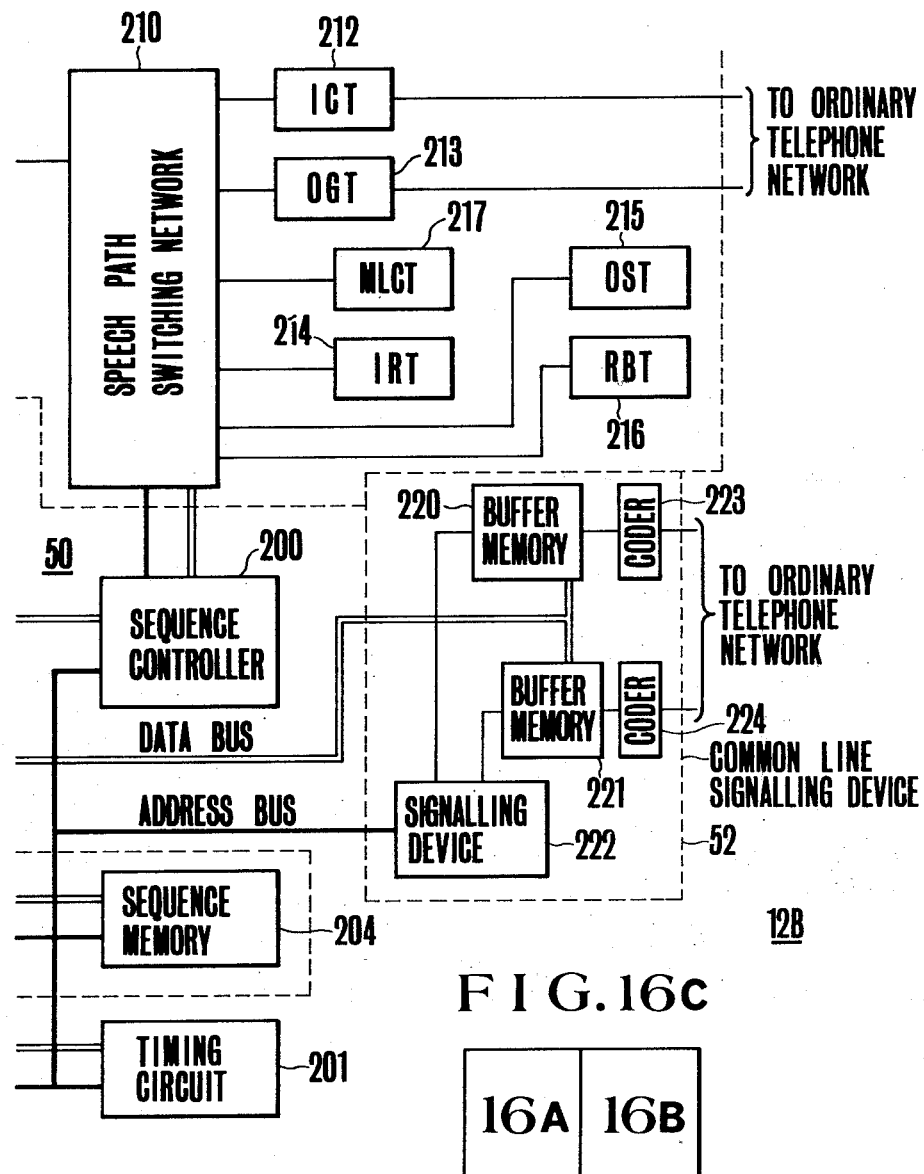
Figure 16C:
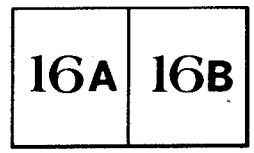

C. Mobile Exchange Unit (MEU) 12B:

The construction of the exchange unit is shown in FIGS. 16A, 16B and 16C. A coder 44 shown in FIGS. 16A, 16B and 16C utilized to exchange control information with the control unit 12A through a common control line 43 has the same construction as the coder 38 shown in FIG. 3.

The second controller 50 of the exchange unit 12B comprises a sequence controller 200 and a timing circuit 201 similar to the first controller 40 shown in FIG. 3.

Also a memory device 51 comprises a temporary memory device 203, a sequence memory device 204 and a station data memory 205 similar to the memory device 41 shown in FIG. 3. The temporary memory device is constituted by a page memory, a subscriber busy memory while the station memory stores the number of speech channels corresponding to each mobile base station.

Like a well known ordinary telephone exchange network, a line switch 30 comprises a speech path switching network 210, a bidirectional trunk line 211, an incoming trunk line (ICT) 212, an outgoing trunk line (OGT) 213, an origination register trunk line (IRT) 214, an originating sender trunk line (OST) 215, a ring-back tone trunk line (RBT) 216. The speech line switch 30 further comprises a mobile loop checking trunk line (MLCT) 217. Except for the ring-back trunk line 217, these trunk lines are connected with a sequence controller through a data bus line and an address bus line whereas the ring-back trunk line 216 is connected to the sequence controller via the address bus line.

A common line signalling device 52 of the mobile exchange unit 12B exchanges control data with an ordinary telephone network and comprises buffer memories 220 and 221 for storing the control data, a signalling device 222 which is provided for the purpose of selecting either one of the buffer memories 220 and 221 in accordance with an address information, and coder 223 and 224 for coding outputs of buffer memories 220, 221. The number of the buffer memories is determined by the number of the connecting lines to the oridinary telephone networks.

Figure 17:
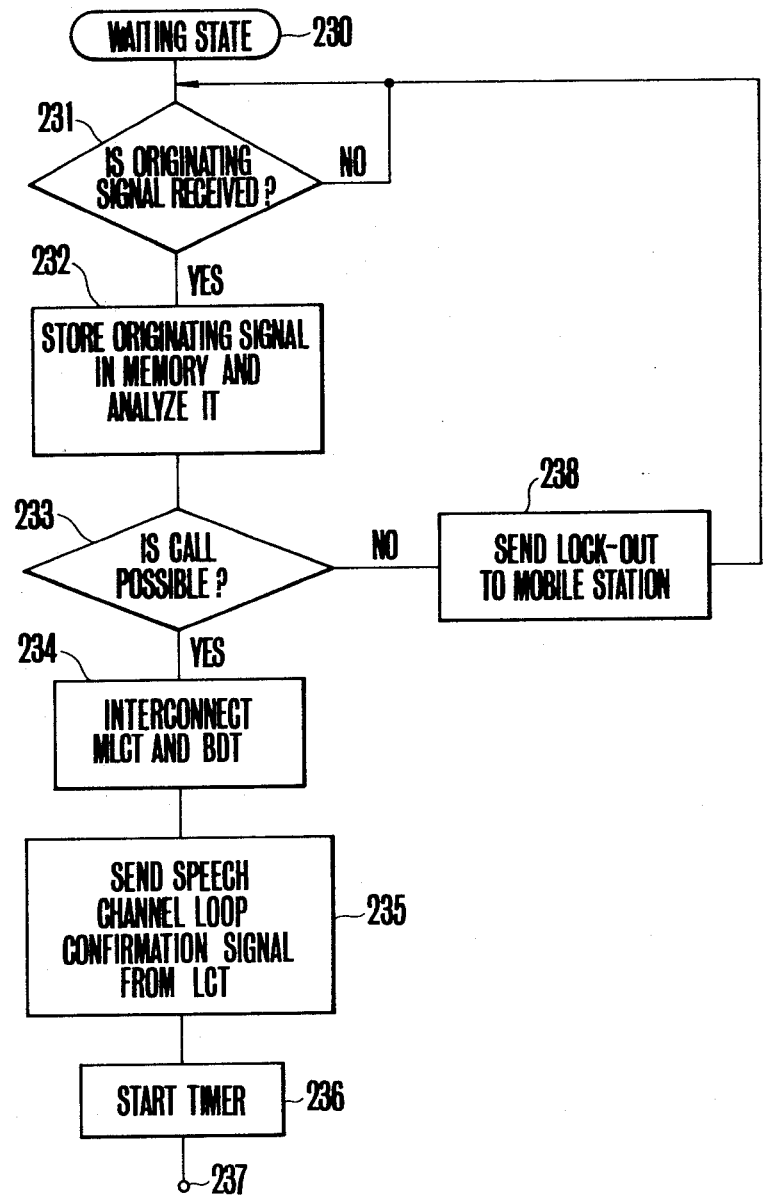
FIGS. 17 and 18 are flow charts showing the call operation sequence of the exchange connector.

FIGS. 17 through 21 are flow charts showing the operation sequence of the sequence controller 200 of the mobile exchange unit 12B. FIG. 17 shows a sequence between a call preparation state and sending of a speech channel loop confirmation signal.

The sequence controller 200 comprising the second controller 50 is normally at a waiting state 230. When a mobile station makes a originating call and when data shown in FIG. 5D is sent to coder 44 from the mobile control unit 12A via common control line 43, the following operations are performed. When the process request detector of the sequence controller 200 detects the data sent to coder 44, the step is advanced from step 231 to step 232 so as to read out a calling signal from the buffer memory device of the coder 44 and store it in the temporary memory device 203. Concurrently therewith, an access is made to the subscribers memory device which constitutes a portion of the temporary memory device 203 to determine whether the mobile station that has transmitted the calling signal can use its service or not, (step 233).

When the mobile station 13 which sends out the call signal can enjoy its own service the step is advanced to step 234 and the sequence controller 200 catches a bidirectional trunk line 211 corresponding to the speech channel information contained in the call signal and connects the bidirectional trunk line (BDT) 211 with a loop checking trunk line (LCT) 217 thereby transmitting a speech channel loop confirmation tone signal from the loop checking trunk line 217 through the bidirectional trunk line 211 (step 235). Thereafter, the sequence controller 200 starts a timer (step 236) and then returns to the waiting state 237.

In step 233, if the result of analysis of the call signal shows that the mobile station 13 cannot have service, the step is advanced to step 238 so as to send a lock-out signal to the mobile station thus returning to the original waiting state 230.

Figure 18:
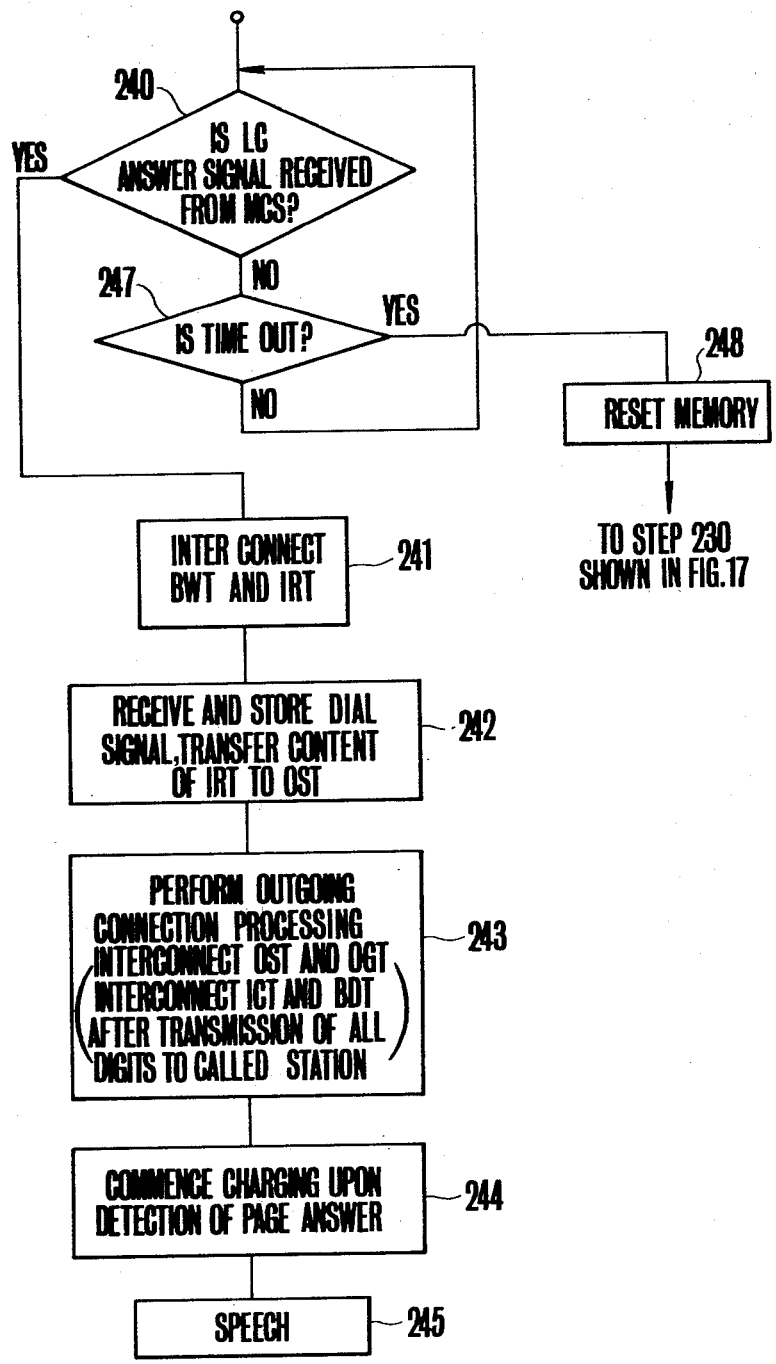

FIG. 18 shows a sequence which is performed after a speech channel loop confirmation tone signal has been sent to the mobile control unit 12A in step 235 shown in FIG. 17, the signal has been confirmed by the mobile control unit 12A in step 140 shown in FIG. 9 and a loop confirmation tone (LC) answer signal has been transmitted in step 142 shown in FIG. 9.

When the sequence controller 200 confirms in step 240 that the LC answer signal, for example induced by the off-hook operation of handset, has been received via the bidirectional trunk line 211 it connects the bidirectional trunk line 211 to the origination register trunk line 214 since the sequence controller 200 receives a dial signal transmitted from the mobile station via the control unit 12A. (step 241)

Then, the IRT 214 stores a dial signal sent from the control unit 12A through the speech channel 29 and the bidirectional trunk line 211 in the origination register trunk line 214 and then transfers the content thereof to the originating sender trunk line 215 (step 242).

Thereafter, the sequence controller 200 performs a well known outgoing connection processing (step 243). For example, when the IRT 214 receives all dial signals sent from the control unit 12A the sequence controller 200 connects the originating sender trunk line 215 to the outgoing trunk line 213 thereby transmitting the dial digits to a called existing exchange office. When the dial signal sending operation described above completes, the outgoing trunk line 213 is connected to the bidirectional trunk line 211.

After the above described operations, when the sequence controller 200 detects a page answer signal, it causes a charge trunk line of the outgoing trunk line 213 to start a charging operation (step 244) thus commencing speech (step 245).

In step 240, if a LC answer signal from a control station were not received within a predetermined time, the step is advanced from step 247 to step 248 to reset the content of the temporary memory device, thus returning to step 230 shown in FIG. 17.

Figure 19:
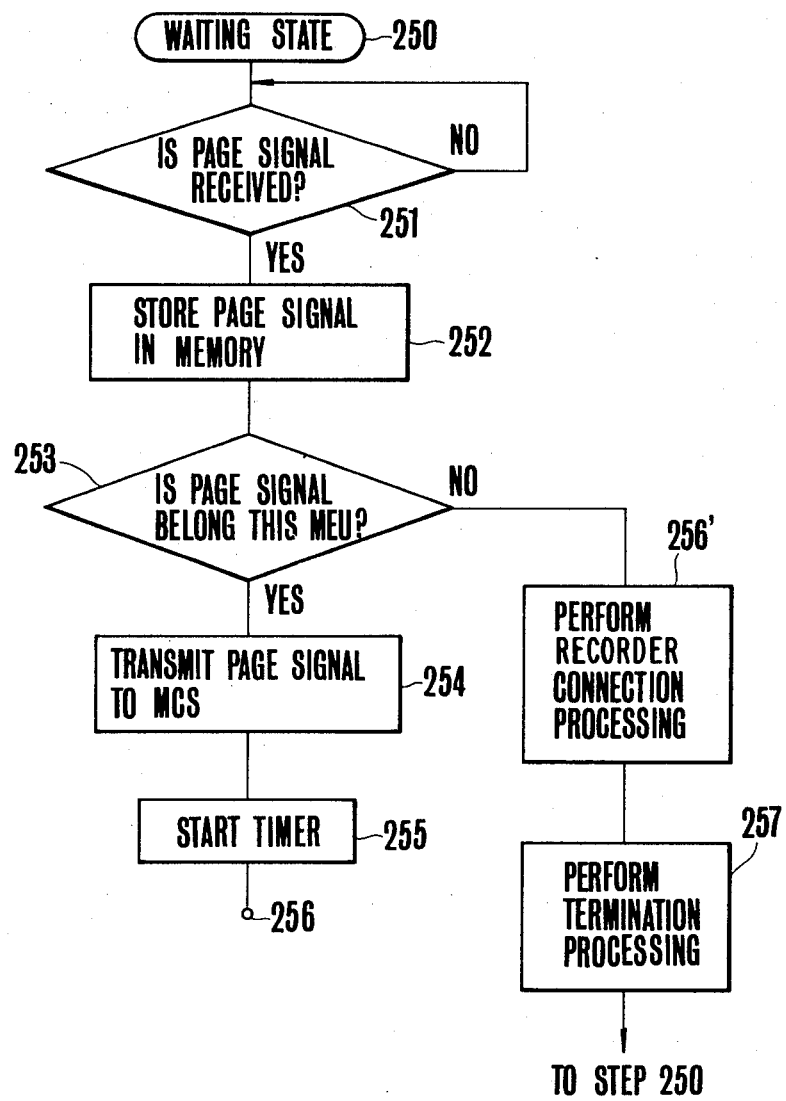
FIGS. 19 through 21 are flow charts showing the originating operation sequence of the exchange connector.
Figure 20:
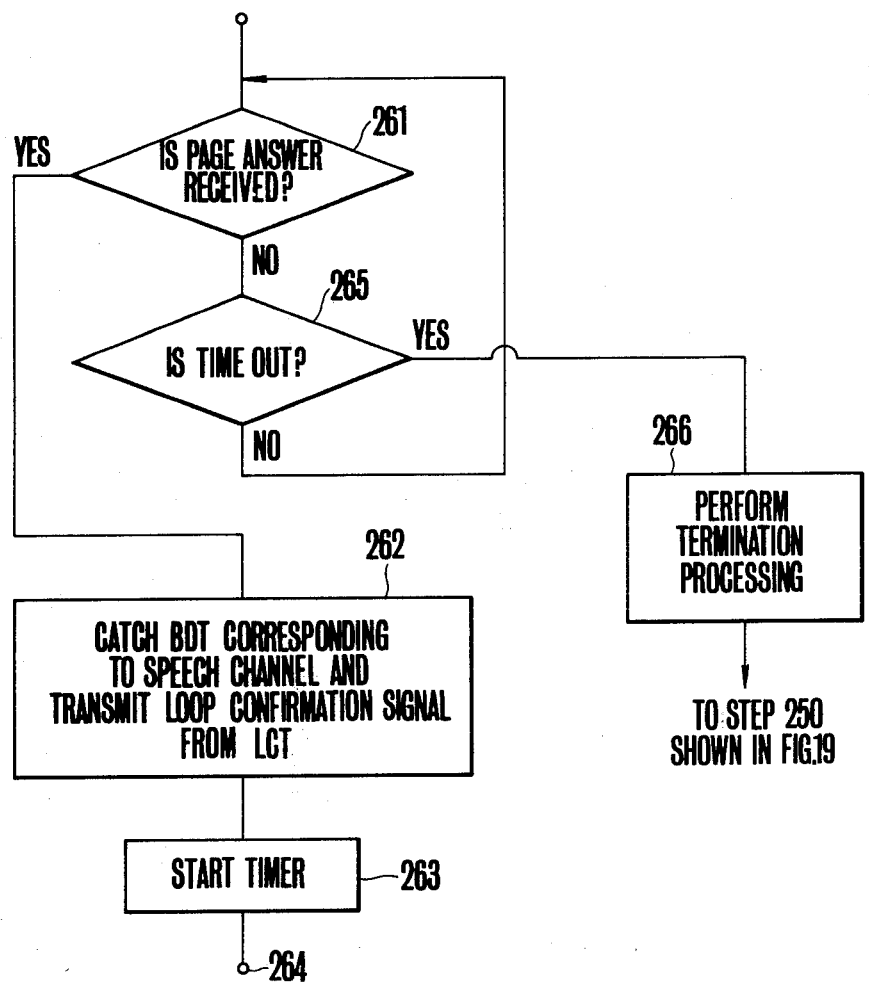
Figure 21:
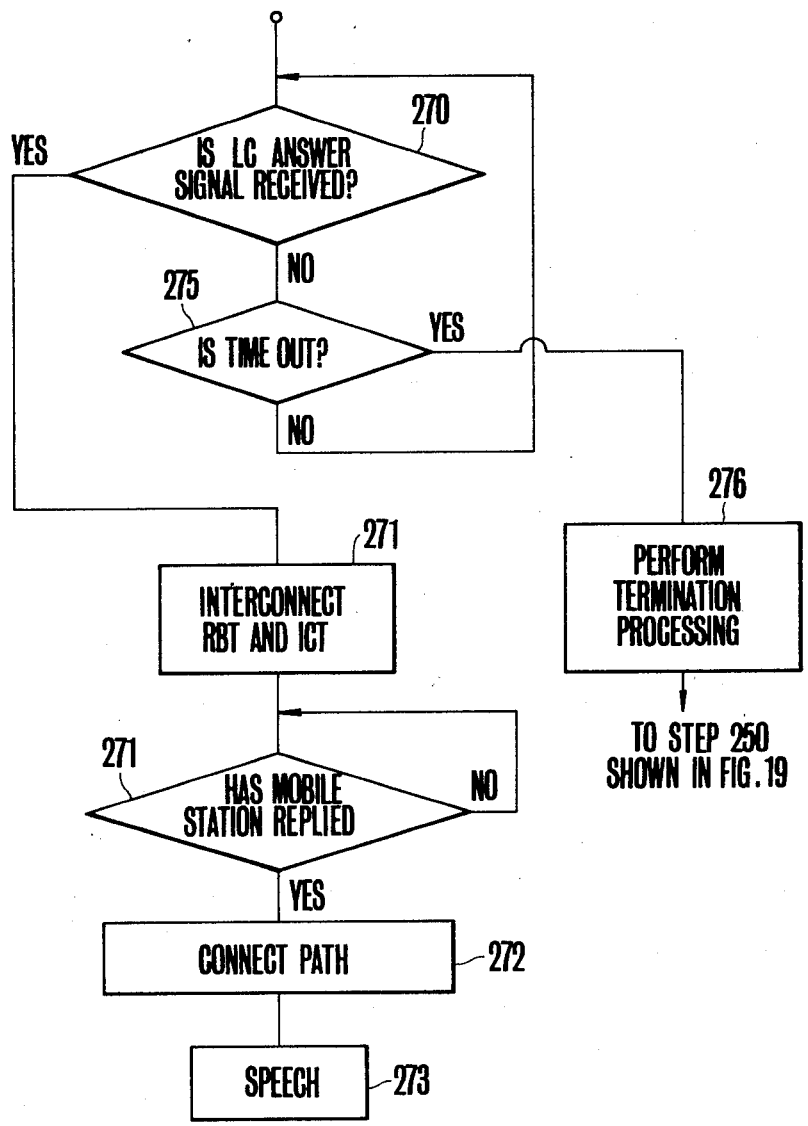

FIGS. 19 through 21 shows the paging operation sequences of the sequence controller 220.

In FIG. 19 when the sequence controller 200 which normally in the waiting state 250 receives a page signal transmitted through the incoming trunk line, the step is advanced from step 251 to step 252 so that the page signal from the ordinary telephone network is stored in the temporary memory device 203 (step 252) and an analysis is made to determine whether the page signal shows that the station can enjoy MEU's own service or not, or whether the station is connectable in its own service area or not by accessing to the subscribers memory device which forms a portion of the temporary memory device 205 (step 253).

Further in this step 253 whether or not the station to be responsed exists in own service area is also examined. When the mobile subscriber station exists in own service area, a response signal from the mobile subscriber station, that is page signal, is transferred to the mobile control unit 12A via coder 44 and the common control line 43 (step 254). The page signal information utilized at this time comprises a signal type information showing that the received signal is a page signal, and a mobile station identification number information.

Thereafter the sequence controller 200 returns to the waiting state (step 256) by starting the timer (step 255).

In step 253, when the page signal shows that the station cannot enjoy its own service the step is advanced to steps 256' and 257 for performing a recorder connection processing and then a termination processing and the sequence is returned to the waiting state (step 250).

FIG. 20 shows an operation sequence of the exchange unit 12B when the sequence controller in the base control unit 12A executed the sequences shown in FIGS. 12 and 13 in response to a page signal sent to the base control unit 12A in step 254 shown in FIG. 19 with the result that a page processing is executed between the base control unit 12A and a mobile station (step 176). When a page answer signal is received from the base control unit 12A via coder 44, the step is advanced from step 261 to step 262. In this case, the page answer signal comprises a signal type information, a mobile station identification number information and an idle speech channel number information as shown in FIG. 11C.

In step 262, the sequence controller 200 connects to a bidirectional trunk line 211 corresponding to the speech channel information contained in the page answer signal for connecting the bidirectional trunk line 211 to the loop checking trunk line 217 thus causing it to transmit a page answer signal to the speech channel 33 through the bidirectional trunk line 211. Then the sequence controller 200 starts a timer (step 263) and returns to the waiting state (step 264). When the page answer signal is not received within a predetermined time the step is advanced from step 265 to step 266 thus performing the termination processing. Then the sequence is returned to the waiting state 250 shown in FIG. 19.

FIG. 21 shows the sequence operation to be performed after the loop confirmation signal sent to the base control unit 12A in step 262 shown in FIG. 20 has been confirmed by the unit 12A (step 190 shown in FIG. 15), and a page answer signal has been sent in step 192.

In step 270 when the sequence controller 200 confirms that it has received a page answer signal through the bidirectional trunk line 211, it connects the incoming trunk line 212 to the ring-back tone signal trunk line 216 (step 271) for supervizing whether the mobile station 13 has answered or not through the bidirectional trunk line 211. When the handset of the mobile station is off-hooked, a speech channel is connected (step 272) thus commencing talking (step 273).

Should the loop confirmation (LC) answer signal be not received within a predetermined interval, the operation is advanced from step 275 to step 276 thus terminating processing. Then the sequence is returned to the waiting state (step 250) shown in FIG. 19.

Figure 22:
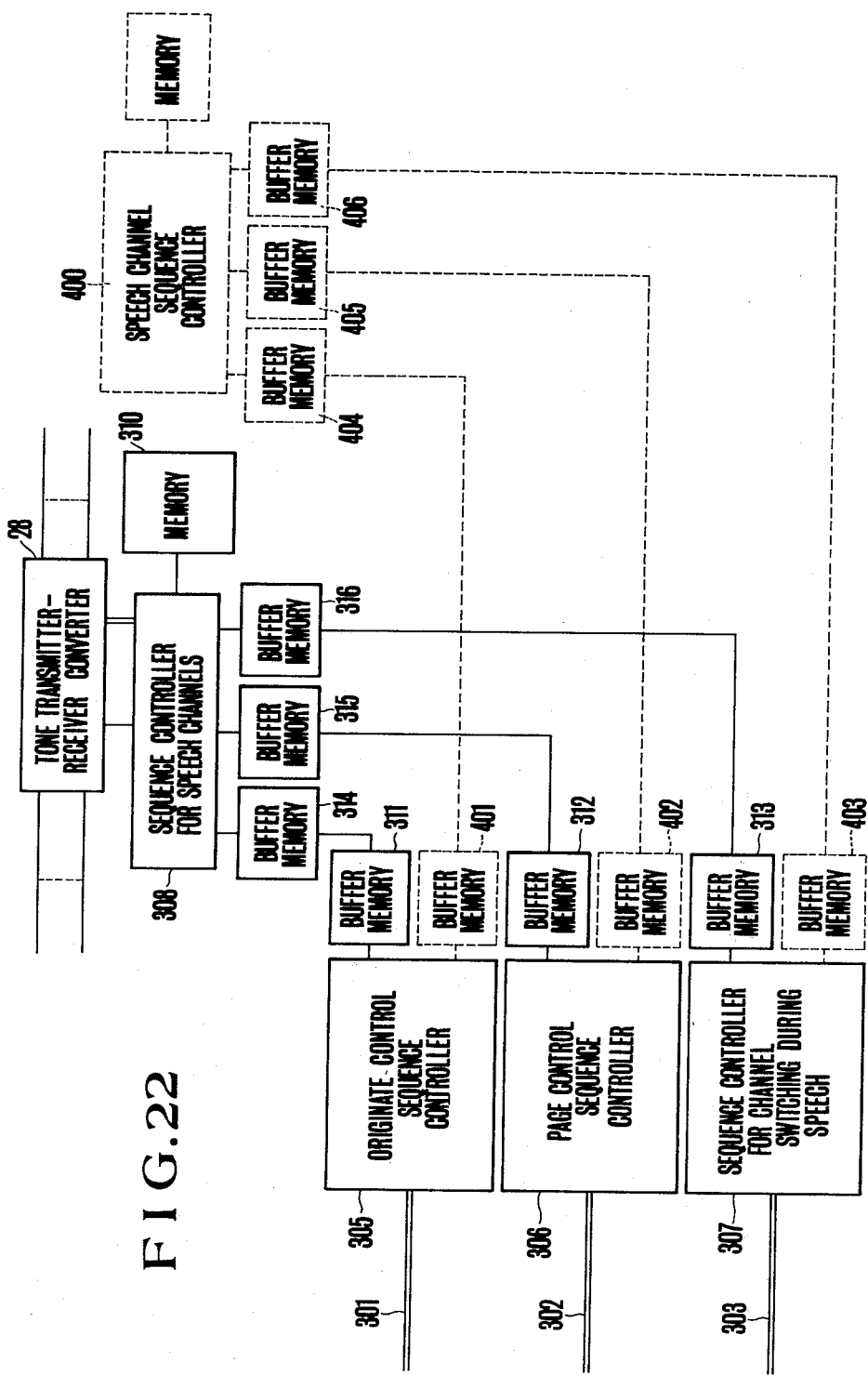

FIG. 22 is a block diagram of a modified embodiment of this invention showing the essential elements of the control unit 12A in which the control channels are classified according to their functions and independent sequence controller is provided for each group of the classified control channels. In the example shown in FIG. 22, the control channels are classified into groups 301, 302 and 303 for calling, paging and switching of the busy channel and individual sequence controllers 305, 306 and 307 are provided for respective control channel group. Further, a sequence controller independent of above described control channels is allocated to the speech channels. With this construction it is necessary to provide only one idle speech channel memory device for the sequence controller 308 which indicates the busy and idle states of all speech channels and such idle speech channel memory device can be used in common. In this case, a pair of sequence memory devices that determines each sequence controller and a memory device that stores informations necessary to operate each sequence controller is allocated thereto. For the sake of simplicity, only a temporary memory device combined with the sequence controller 308 is shown. In FIG. 22, reference numerals 311 through 316 show buffer memory devices which are used to improve the interface where data information is exchanged between the sequence controller 308 and respective sequence controllers.

Each one of the sequence controllers 305 through 308 operates according to the sequence shown in FIG. 23. Since the operation sequence of the mobile radio telephone system has already been described in connection with the above described embodiments the operation of each sequence controller can be understood and since this operation is not material to this invention, in FIG. 23, they are shown diagrammatically.

A originate control sequence controller 305 is in charge from step 330, in which a call signal is received, to step 331 in which a talking zone is selected. A concrete example of step 332 corresponds to steps 120 through 123 shown in FIG. 7.

A page control sequence controller 306 is in charge of step 340 in which a paging is made, step 241 in which a page signal is sent to a mobile station, a step 342 in which a page answer signal is received, and a step 343 in which a talking zone is selected. Concrete examples of the operation sequence 345 is steps 160 through 173 shown in FIGS. 12 and 13.

Further, a sequence controller 307 for channel switching during speech is used where a mobile station which starts talking in one radio zone still continues talking even when it has moved into adjacent radio zone. The sequence controller 307 executes an operation sequence 355 during speech including step 350 in which the speech quality (S/N) of a designated speech channel through which speech or talking is made degrades, step 351 in which some of the radio zones adjacent a radio zone of a control station to which the designated speech channel belongs are selected, step 352 in which a control station corresponding to these radio zones supervises a busy channel of a mobile station, and signals (S/N) obtained in respective radio mobile stations are compared (in this case, exchange of signals with adjacent radio zones is done by using the channel switching control channel during speech), and step 353 in which a radio zone whose S/N ratio is largest is judged among a number of adjacent radio zones.

The operation sequence following the operation sequences 332, 345 and 355 of respective sequence controllers trollers 305 through 307 is common to all and such common operation sequence is executed by the sequence controller 308 for controlling speech channels. As shown in FIG. 23, following the talking zone selection operation made by respective sequence controllers described above, the sequence controller 308 operates to select (step 360) idle speech channels among speech channels belonging to the base station in a radio zone which is selected in accordance with control information sent through a buffer memory device, designates one idle speech channel among the selected idle channels (step 361), confirms that a speech channel loop has been established (step 362), and performs processing subsequent to the establishment of the speech channel (step 363).

During the operation sequence described above, the sequence controller 308 sequentially processes the control information sent from buffer memory devices 314, 315 and 316 according to their order of arrival or a predetermined order of priority. The operation sequence of the sequence controller 308 corresponds to step 124 and the following steps shown in FIG. 7, for example.

The construction shown in FIG. 22 improves the mobile control unit shown in FIGS. 2 and 3 as follows. More particularly, in FIGS. 2 and 3, all control signals regarding calling, paging and switching position registration of the busy channel are transmitted through the same channel, and the processing of these signals is executed by a single controller common to all channels. For this reason, the system shown in FIGS. 2 and 3 has the following defects.

When a fault occurs in a controller and or control channel all controls for calling, paging and switching of the speech channels at the time of entering into another radio zone cannot be made effectively, and even a small fault causes a large fault.

Even when the radio system and the mobile exchange unit are independently controlled as shown in FIGS. 2 and 3, only one controller is provided for a plurality of speech channels so that the capacity of processing subscribers is not sufficient as the number of the subscribers increases.

With the construction shown in FIG. 22, however, as the sequence controllers are classified according to their functions, even when a call system, becomes faulty, the fault does not extend to the paging as well as the switching control of the speech channel when a mobile station enters into other radio zone.

Furthermore, when the sequence controllers are provided for different control functions the control operation of the entire system can be accelerated because different controls can be processed independently. This increases the utilization efficiency of the channel and hence the number of subscribers. Usually, the originating and paging sequence 332 requires several miliseconds but the switching sequence at the time of changing the radio zone requires about 10 miliseconds, meaning that provision of individual sequence controllers for different functions is effective.

In FIG. 22, the sequence controller 308 for controlling speech channels is used also for other controls (calling, paging and switching of speech channels). As a consequence, a number of controls may concentrated on the sequence controller. In such case, it is advantageous to provide individual speech channel control sequence controllers for respective speech channel groups allocated for respective radio zones or respective base stations. In this case, in addition to a speech channel sequence controller 308, sequence controllers 305, 306 and 307 are connected to the other speech channel sequence controller 400 via buffer memory devices 401 through 406.

In FIG. 23, the sequence 410 is executed by the sequence controller 400 like sequence 365.

In the modification shown in FIG. 22, although the sequence controllers of the mobile control unit were classified according to their control functions, the sequence controllers of the mobile exchange unit can also be classified in the same manner. Also in FIG. 22 instead of classifying the sequence controllers according to their functions they can be classified into two, one for the control channels and the other for the speech channels. Alternatively, the sequence controllers may be classified according to the radio zones.

What is claimed is:

1. In a mobile radio telephone system for connecting mobile stations to a telephone network of the type wherein the service area of the system is divided into a plurality of radio zones, one of a plurality of base stations is installed in respective radio areas, each of the base stations is connected to said mobile stations through a common control channel frequency and a plurality of speech channels, a control unit connected between an ordinary telephone network and said plurality of base stations, the improvement wherein said control unit comprises a telephone exchange control unit provided with a telephone exchange connector including a speech path switch and a radio channel control unit including a radio channel control system and wherein said radio channel control unit and said telephone exchange control unit includes first and second sequence controllers, respectively, having independent functions, said first sequence controller being responsive to the intensities of signal received by said base stations indicated on said control channel, said signal being transmitted from a transmitting mobile station, and designating an idle speech channel in the base station having received the maximum signal intensity from said mobile station, said second sequence controller being responsive to a speech channel signal received from said mobile station to connect said mobile station signal to a telephone network through a switch controlled by said second sequence controller, whereby information is exchanged among respective base stations through the speech channels and the control channel.

2. The mobile radio telephone system according to claim 1 wherein said first sequence controller comprises a plurality of function sequence controller classified according to functions to be controlled.

3. The mobile radio telephone system according to claim 1 wherein each of said independent sequence controllers is provided with an individual memory device.

4. The mobile radio telephone system according to claim 1 wherein said first sequence controller comprises a control sequence controller for controlling said control channel and a speech sequence controller for assigning said radio speech channels.

5. In a mobile radio telephone system for connecting mobile subscriber stations to a telephone network of the type wherein the service area of the system is divided into a plurality of radio zones, one of a plurality of base stations is installed in each radio zone, each of the base stations is connected to said mobile stations through a common control channel frequency and a plurality of speech channels, a control unit connected between an ordinary telephone network and said plurality of base stations, the improvement wherein said control unit comprises a telephone exchange control unit provided with a telephone exchange connector including a speech path switch and a radio channel control unit including a radio channel control system, and wherein said radio channel control unit and said exchange control unit include first and second sequence controllers, respectively, having independent functions, said first sequence controller being responsive to the intensities of signal received by said base stations indicated on said control channel, said signal being transmitted from a transmitting mobile station, and designating an idle speech channel in the base station having received the maximum signal intensity from said mobile station, said second sequence controller being responsive to the speech channel signal received from said mobile station to connect said mobile station signal to a telephone network through a switch controlled by said second sequence controller, whereby information is exchanged among respective base stations through the speech channels and the control channels, wherein the radio channel control unit is provided with a plurality of discrete sequence controllers for the control of each base station.

6. In a mobile radio telephone system for connecting mobile subscriber stations to a telephone network of the type wherein the service area of the system is divided into a plurality of radio zones, one of a plurality of base stations is installed in each zone, and a control unit is connected between an ordinary telephone network and said plurality of base stations, and wherein each of the base stations is connected to said control unit through a common control channel frequency and a plurality of speech channels, the improvement wherein said control unit comprises a telephone exchange control unit provided with a telephone exchange connector including a speech path switch and a radio channel control unit including a radio control system, and wherein said radio channel control unit and said telephone exchange control unit include first and second sequence controllers, respectively, having independent functions, said first sequence controller being responsive to the intensities of signal received by said base stations indicated on said control channel, said signal being transmitted from a transmitting mobile station, and designating an idle radio speech channel in the base station having received the maximum signal intensity, said second sequence controller being responsive to the speech channel signal received from said mobile station to connect said mobile station to a telephone network through a switch controlled by said second sequence controller and after a speech channel loop established between the mobile station and the radio channel control unit has been confirmed by said first sequence controller in response to a signal from the mobile station on said speech channel, information necessary to connect a speech path to the ordinary telephone network is transmitted to the second sequence controller.

7. The mobile radio telephone system according to claim 6 wherein the second sequence controller controls a subscriber memory device necessary to control toll charging.

8. The mobile radio telephone system according to claim 6 wherein said first sequence controller controls an idle speech channel memory device.

9. The mobile radio telephone system according to claim 6 wherein said first sequence controller controls means for converting a signal in said radio zone into a signal to be transmitted to said telephone network.

10. The mobile radio telephone system according to claim 9 wherein said first sequence controller converts a signal utilized in said radio signal into a signal utilized in a common telephone network.

* * * * *

UNITED STATES PATENT AND TRADEMARK OFFICE
CERTIFICATE OF CORRECTION

PATENT NO. : 4,242,538

DATED : December 30, 1980

INVENTOR(S) : Sadao Ito et al

It is certified that error appears in the above—identified patent and that said Letters Patent is hereby corrected as shown below:

Column 1, line 42, after "complicated" add -- processing --;
Column 1, lines 51, 52, change "as in the prior art by a single controller" to read -- controlled by a single controller as in the prior art --;

Column 6, line 7, after "radio" add -- zone --;

Column 6, line 15, after "memory" add -- device --;

Column 7, line 3, after "control" add -- channels --;

Column 9, line 41, delete "by";

Column 10, line 43, change "off-hook" to -- off-hooking --; and

Column 20, line 10, change "241" to -- 341 --.

Signed and Sealed this

Twenty-fourth Day of November 1981

[SEAL]

Attest:

GERALD J. MOSSINGHOFF

*Attesting Officer*     *Commissioner of Patents and Trademarks*